United States Patent
Usuba

(10) Patent No.: US 8,819,396 B2
(45) Date of Patent: Aug. 26, 2014

(54) PARALLEL PROCESSING USING PLURAL PROCESSING MODULES WHEN PROCESSING TIME INCLUDING PARALLEL CONTROL OVERHEAD TIME IS DETERMINED TO BE LESS THAN SERIAL PROCESSING TIME

(75) Inventor: Ryoko Usuba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 383 days.

(21) Appl. No.: 13/223,915

(22) Filed: Sep. 1, 2011

(65) Prior Publication Data

US 2012/0151190 A1 Jun. 14, 2012

(30) Foreign Application Priority Data

Dec. 9, 2010 (JP) ................................. 2010-275014

(51) Int. Cl.
G06F 9/44 (2006.01)
(52) U.S. Cl.
USPC .............................................. 712/32; 712/30
(58) Field of Classification Search
None
See application file for complete search history.

(56) References Cited

U.S. PATENT DOCUMENTS

| 7,652,671 | B2 | 1/2010 | Nagao et al. |
| 7,986,419 | B2 * | 7/2011 | Mazur .......................... 358/1.13 |
| 2013/0159397 | A1 * | 6/2013 | Yamashita et al. ............. 709/203 |

FOREIGN PATENT DOCUMENTS

| JP | 2001-236227 A | 8/2001 |
| JP | 2005-301858 A | 10/2005 |

* cited by examiner

*Primary Examiner* — Kenneth Kim
(74) *Attorney, Agent, or Firm* — Sughrue Mion, PLLC

(57) ABSTRACT

A data processing apparatus includes an output unit. The output unit determines, when parallel control is performed in a data processor created in the data processing apparatus so that plural processing modules forming the data processor perform data processing in parallel, on the basis of a value representing a parallel-processing time for which at least two processing modules are operated in parallel and a value representing a control time, which is not necessary when serial control is performed so that the processing modules serially perform data processing but which is necessary when the parallel control is performed so that the processing modules perform data processing in parallel, whether a time necessary to complete data processing performed by the data processor under the parallel control would be shorter than a time necessary to complete data processing performed by the data processor under the serial control, and outputs a determination result.

21 Claims, 22 Drawing Sheets

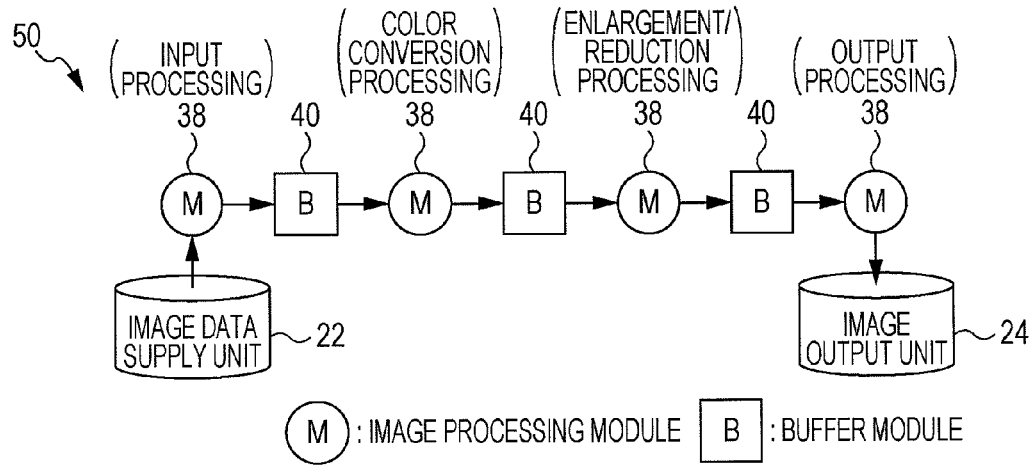
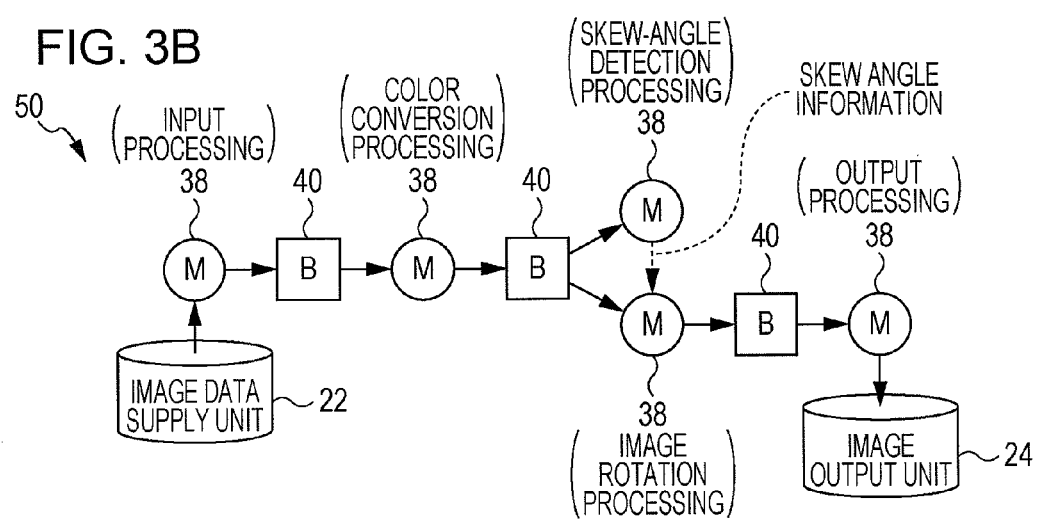
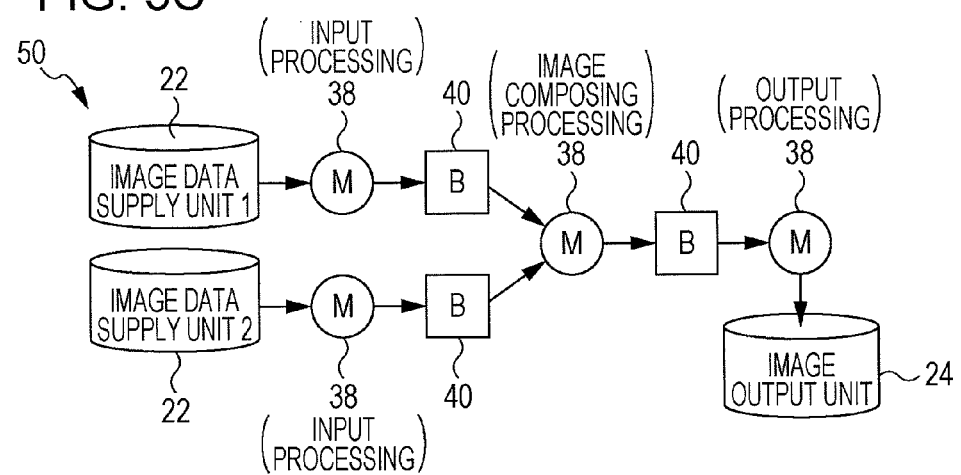

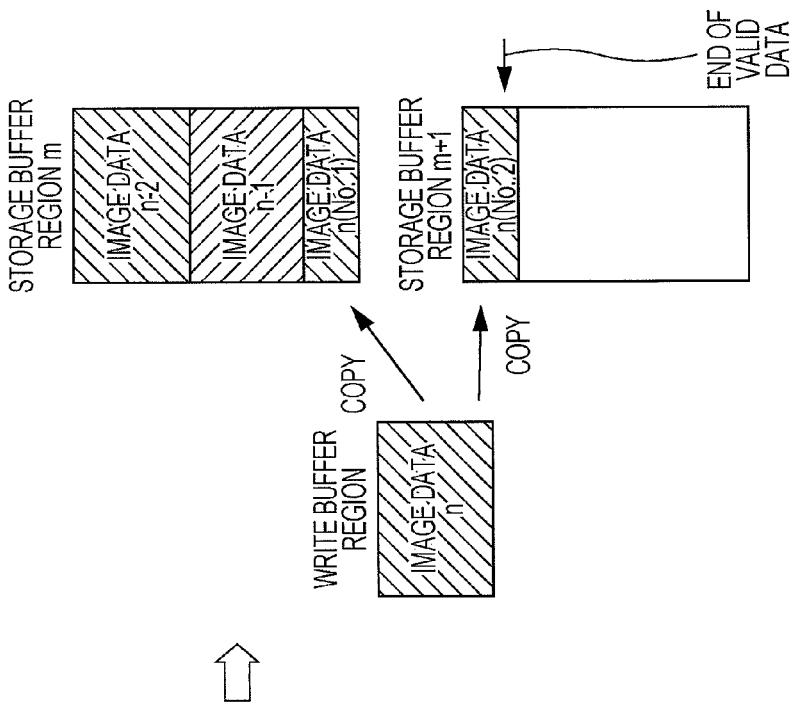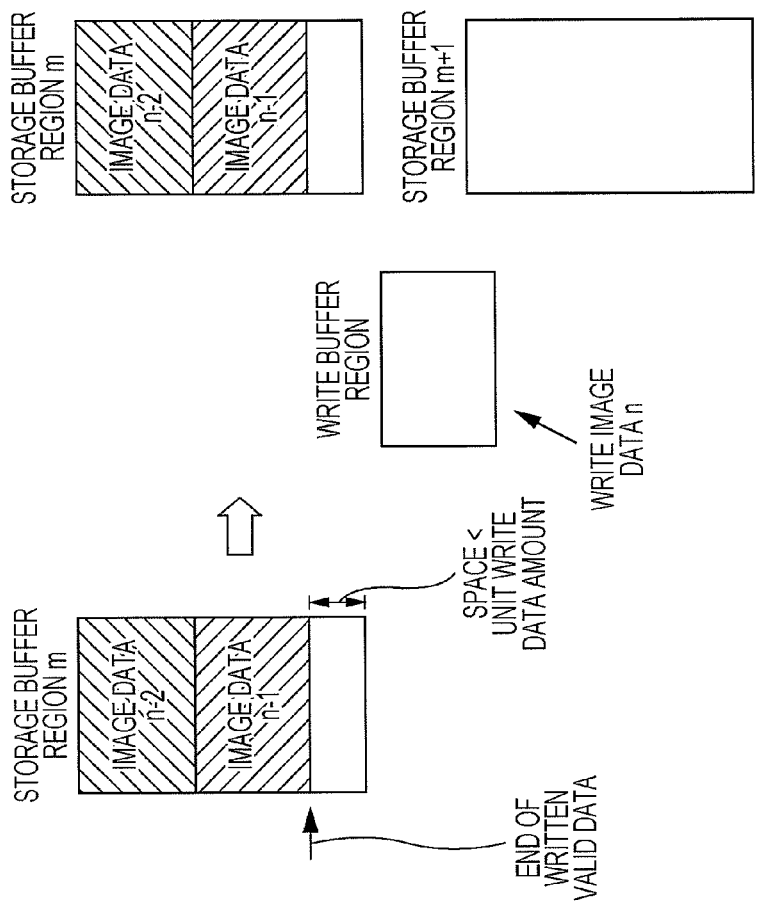

◯ : IMAGE PROCESSING MODULE

FIG. 21A

| | a | b | c | d |
|---|---|---|---|---|
| AMOUNT OF MONEY | CALCULATE CONSUMPTION TAX | ADD 1000 | CALCULATE 10% | SUBTRACT 50 |
| 3305 → | 3470 → | 4470 → | 447 → | 397 |
| 1000 → | 1050 → | 2050 → | 205 → | 155 |
| 105 → | 110 → | 1110 → | 111 → | 61 |
| 28000 → | 29400 → | 30400 → | 3040 → | 2990 |
| 300 → | 315 → | 1315 → | 131.5 → | 81.5 |
| 5550 → | 5828 → | 6828 → | 682.8 → | 632.8 |
| 550 → | 578 → | 1578 → | 157.8 → | 107.8 |
| 2200 → | 2310 → | 3310 → | 331 → | 281 |

INDIVIDUAL FIELDS CAN BE PROCESSED IN PARALLEL → PERFORMANCE IS IMPROVED BY PERFORMING PARALLEL PROCESSING

FIG. 21B

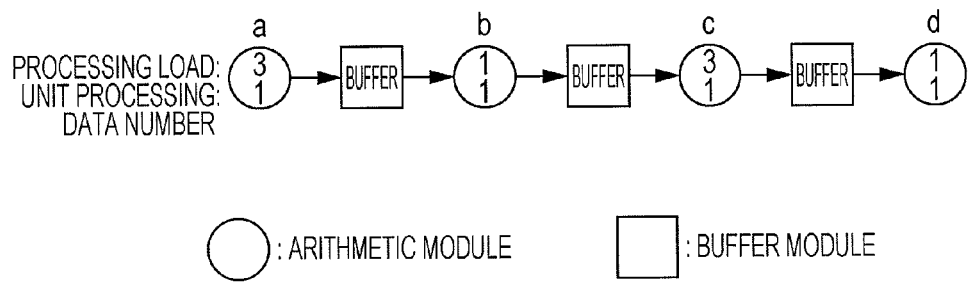

○ : ARITHMETIC MODULE      ☐ : BUFFER MODULE

FIG. 21C

SUM OF PROCESSING LOADS OF ARITHMETIC MODULES = 3 + 1 + 3 + 1 = 8

PROCESSING WAIT DEGREE = $\frac{1+1+1+1}{1+1+1+1}$ = 1

NUMBER OF ARITHMETIC MODULES = 4

| AMOUNT OF MONEY | e TOTAL | f CALCULATE RATIO | g TOTAL ITEM BY ITEM | h RATIO ITEM BY ITEM |
|---|---|---|---|---|
| 3305 | 41010 | 8.06 | 79.03 | 0.10 |
| 1000 | | 2.44 | | 0.03 |
| 105 | | 0.26 | | 0.00 |
| 28000 | | 68.28 | | 0.86 |
| 300 | | 0.73 | 20.97 | 0.03 |
| 5550 | | 13.53 | | 0.65 |
| 550 | | 1.34 | | 0.06 |
| 2200 | | 5.36 | | 0.26 |

PROCESSING CANNOT BE EXECUTED UNTIL PREVIOUS PROCESSING FINISHES → PERFORMANCE IS NOT IMPROVED EVEN BY PERFORMING PARALLEL PROCESSING

FIG. 22B

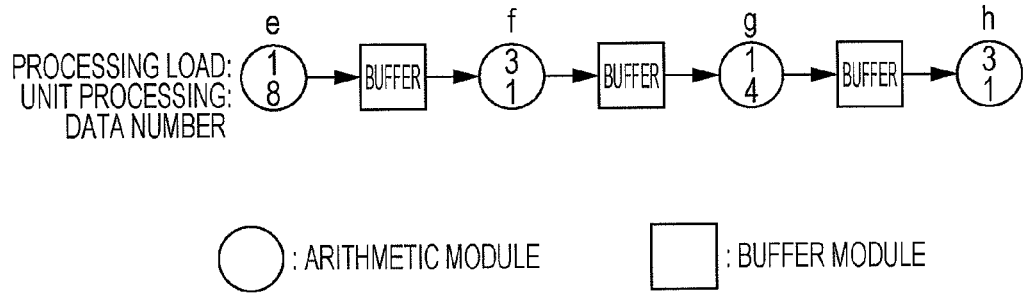

PROCESSING LOAD: / UNIT PROCESSING DATA NUMBER

○ : ARITHMETIC MODULE  □ : BUFFER MODULE

FIG. 22C

SUM OF PROCESSING LOADS OF ARITHMETIC MODULES = 1 + 3 + 1 + 3 = 8

PROCESSING WAIT DEGREE = $\frac{1+1+1+1}{8+1+4+1}$ = 0.286

NUMBER OF ARITHMETIC MODULES = 4

↓

8 × 0.286 = 2.28 < 4

PARALLEL PROCESSING USING PLURAL PROCESSING MODULES WHEN PROCESSING TIME INCLUDING PARALLEL CONTROL OVERHEAD TIME IS DETERMINED TO BE LESS THAN SERIAL PROCESSING TIME

CROSS-REFERENCE TO RELATED APPLICATIONS

This application is based on and claims priority under 35 USC 119 from Japanese Patent Application No. 2010-275014 filed Dec. 9, 2010.

BACKGROUND (i) Technical Field

The present invention relates to data processing apparatuses, data processing methods, and non-transitory computer readable storage media.

SUMMARY

According to an aspect of the invention, there is provided a data processing apparatus in which a data processor is created by connecting plural processing modules that perform data processing including different data processing operations or that perform a data processing operation with different contents. Each of the plural processing modules has a function of obtaining data from a processing module positioned prior to itself, performing a predetermined processing operation on the obtained data, and outputting data as a result of performing the predetermined processing operation on the obtained data or outputting a result of processing the obtained data to a processing module positioned subsequent to itself. The data processing apparatus includes an output unit. The output unit determines, when parallel control is performed in the data processor so that the plural processing modules perform data processing in parallel, on the basis of a value representing a parallel-processing time for which at least two of the processing modules are operated in parallel and a value representing a control time, which is not necessary when serial control is performed so that the processing modules serially perform data processing but which is necessary when the parallel control is performed so that the processing modules perform data processing in parallel, whether a time necessary to complete data processing performed by the data processor under the parallel control would be shorter than a time necessary to complete data processing performed by the data processor under the serial control, and outputs a determination result.

BRIEF DESCRIPTION OF THE DRAWINGS

Exemplary embodiment(s) of the present invention will be described in detail based on the following figures, wherein:

FIGS. 3A through 3C illustrate examples of the configuration of an image processor;

FIGS. 5A through 5C schematically illustrate image data to be written are to be stored in plural storage unit buffer regions;

FIGS. 21A through 22C illustrate specific examples of determinations of the parallel processing performance.

DETAILED DESCRIPTION

Figure 1:
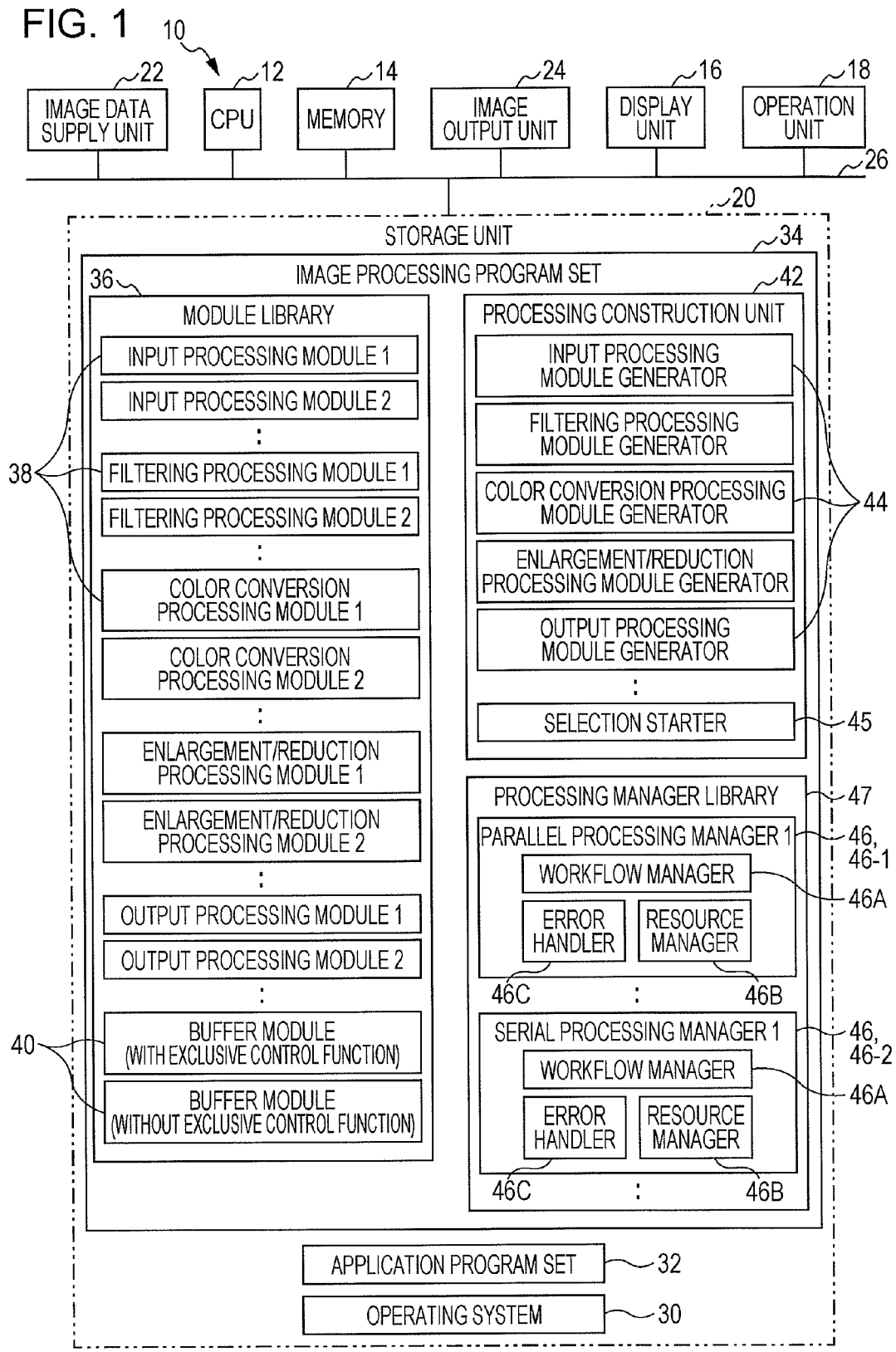
FIG. 1 is a block diagram illustrating the schematic configuration of a computer (image processing apparatus) according to an exemplary embodiment of the invention.

An exemplary embodiment of the present invention will be described below in detail with reference to the accompanying drawing. FIG. 1 illustrates a computer 10 configured to function as an image processing apparatus incorporating a data processing apparatus of an exemplary embodiment of the invention. The computer 10 may be integrated in a certain image handling device that is necessary to perform image processing within the device, such as a copying machine, a printer, a FAX machine, a multifunction device having the functions of those devices, a scanner, or a photo printer. Alternatively, the computer 10 may be an independent computer, such as a personal computer (PC), or may be a computer integrated in a portable machine, such as a personal digital assistant (PDA) or a cellular telephone.

The computer 10 includes a central processing unit (CPU) 12, a memory 14, a display unit 16, an operation unit 18, a storage unit 20, an image data supply unit 22, and an image output unit 24. Those components are connected to one another via a bus 26. If the computer 10 is integrated in the above-described image handling device, a display panel including a liquid crystal device (LCD) and a numeric keypad, which are provided in the image handling device, may be used as the display unit 16 and the operation unit 18, respectively. If the computer 10 is an independent computer, a display connected to the computer 10 may be used as the display unit 16, and a keyboard and a mouse connected to the computer 10 may be used as the operation unit 18. As the storage unit 20, a hard disk drive (HDD) may be suitably used. Alternatively, another non-volatile storage unit, such as a flash memory, may be used.

As the image data supply unit 22, any type of device may be used as long as it has the function of supplying certain image data. For example, an image reader for reading an image recorded on a recording material, such as paper or a photo film, and for outputting image data representing the read image may be used. Alternatively, a receiver for receiving image data from an external source via a communication circuit, or an image storage unit (memory 14 or storage unit 20) for storing image data, etc. may be used. As the image output unit 24, any type of device may be used as long as it has the function of outputting image data subjected to image processing or an image represented by that image data. For example, an image recorder for recording an image represented by image data on a recording material, such as paper or a photosensitive material, may be used. Alternatively, a display unit for displaying an image represented by image data on a display, etc., a writer for writing image data into a recording medium, a sender for sending image data via a communication circuit, may be used. Alternatively, the image output unit 24 may be an image storage unit (memory 14 or storage unit 20) for simply storing image data subjected to image processing.

In the storage unit 20, as shown in FIG. 1, programs of an operating system (OS) 30, an image processing program set 34, and application programs 32 (shown as an application program set 32 in FIG. 1) are stored as various programs executed by the CPU 12. The programs of the OS 30 are used for the management of the resources, such as the memory 14, and for the management of the execution of programs by the CPU 12. The programs of the OS 30 are also used for controlling communication between the computer 10 and an external source. The image processing program set 34 is used for enabling the computer 10 to function as an image processing apparatus. The application programs 32 are used for enabling the image processing apparatus to perform desired image processing.

The image processing program set 34 includes programs which have been developed for the purpose of reducing a load experienced when developing the above-described various image handling devices or cellular telephones or a load experienced when developing image processing programs that can be used in PCs, etc. Accordingly, the programs of the image processing program set 34 can be used by all the image handling devices, cellular telephones, and various devices (platforms), such as PCs. In response to an instruction from the application programs 32, the image processing apparatus, which is implemented by the image processing program set 34, constructs an image processor that performs image processing instructed by the application programs 32. In this manner, the image processing apparatus performs image processing by using the image processor (details will be given later). The image processing program set 34 provides the application programs 32 with a certain interface. This interface is used for giving an instruction to construct an image processor that performs desired image processing (image processor having a desired configuration) or for giving an instruction to execute the desired image processing by using the constructed image processor. Accordingly, when developing a certain new device in which image processing is required to be performed within the device, it is not necessary to develop a new program for performing such image processing. It is sufficient that the application programs 32 causing the image processing program set 34 to perform such image processing by use of the above-described interface be developed. Thus, a load experienced when developing devices and programs can be decreased.

As described above, the image processing apparatus implemented by the image processing program set 34 constructs an image processor that performs image processing in accordance with an instruction from the application programs 32 and performs the image processing by using the constructed image processor. Accordingly, even if the color space or the number of bits assigned to each pixel of image data to be subjected to image processing is indefinite, or even if the content or the procedure/parameters of image processing to be performed is indefinite, the application program 32 simply gives an instruction to reconstruct the image processor, thereby making it possible to flexibly change image processing to be executed by the image processing apparatus (image processor) in accordance with image data to be processed.

Details of the image processing program set 34 will be described below. The image processing program set 34 includes, as shown in FIG. 1, a module library 36, a program of a processing construction unit 42, and a processing manager library 47. The processing construction unit 42 of this exemplary embodiment constructs, as shown in FIGS. 3A through 3C, in response to an instruction from the application programs 32, an image processor 50 by connecting plural image processing modules 38 and buffer modules 40 in the form of a pipeline or a directed acyclic graph (DAG). The image processing modules 38 perform predetermined image processing. Each of the buffer modules 40 is disposed at least at a position prior to or subsequent to the corresponding image processing module 38 and includes buffers for storing image data therein. Each of the image processing modules 38 forming the image processor 50 is, in reality, a first program or a second program. The first program is executed by the CPU 12 and causes the CPU 12 to perform predetermined image processing. The second program is executed by the CPU 12 and is used for instructing an external image processing apparatus (e.g., a dedicated image processing board), which is not shown in FIG. 1, to execute processing. In the above-described module library 36, plural programs of the image processing modules 38 to perform different types of predetermined image processing operations (e.g., inputting, filtering, color conversion, enlargement/reduction, skew-angle detection, image rotation, image combining, outputting, etc.) are registered. For a simple representation, a description will be hereinafter given, assuming that each of the image processing modules 38 forming the image processor 50 is the first program.

Figure 4A:
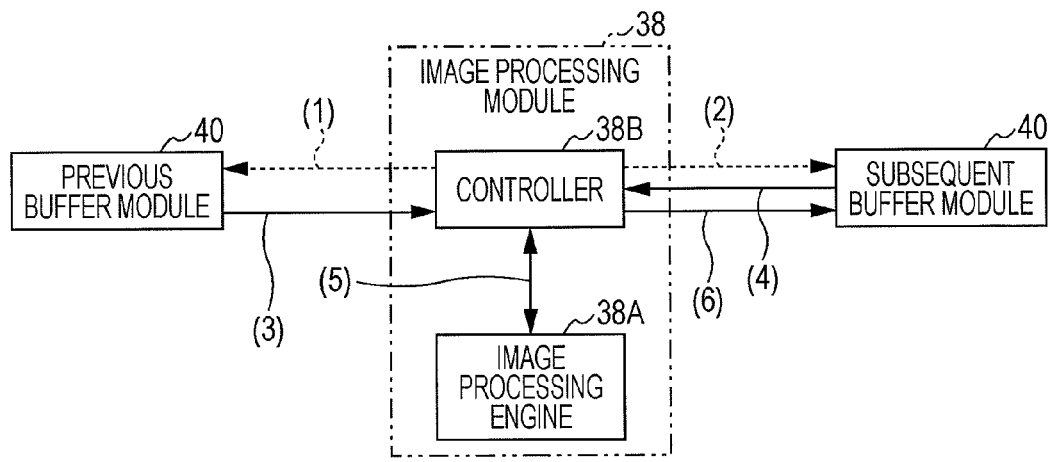
FIGS. 4A and 4B are block diagrams illustrating the schematic configurations and processing to be executed of an image processing module and a buffer module, respectively.

Each of the image processing modules 38 includes, as shown in FIG. 4A by way of example, an image processing engine 38A and a controller 38B. The image processing engine 38A performs image processing on image data in accordance with an amount of data to be processed at one time (during unit processing) (such an amount of data is hereinafter referred to as the "unit-processing data amount"). The controller 38B controls input and output of image data into and from the modules which are disposed prior to and subsequent to the corresponding image processing module 38, and also controls the image processing engine 38A. The unit-processing data amount handled in each of the image processing modules 38 is selected and set in advance from among certain numbers of bytes assigned to, e.g., one line of an image, plural lines of an image, one pixel of an image, and one frame of an image, in accordance with the type of image processing performed by the image processing engine 38A. For example, if the image processing module 38 performs color conversion processing or filtering processing, the unit-processing data amount is one pixel of an image. If the image processing module 38 performs enlargement/reduction processing, the unit-processing data amount is one line or plural lines of an image. If the image processing module 38 performs image rotation processing, the unit-processing data amount is one frame of an image. If the image processing module 38 performs image compression/decompression, the unit-processing data amount is N bytes which are determined by the execution environments.

Additionally, in the module library 36, the image processing modules 38 that perform, by using the image processing engines 38A, image processing operations whose types are the same but contents are different are also registered. In FIG. 1, such image processing modules 38 are shown as "module 1" and "module 2". For example, the image processing modules 38 that perform enlargement/reduction processing include an image processing module 38 that reduces input image data by 50% by sampling every other pixel and an image processing module 38 that enlarges or reduces image data in accordance with a specified enlargement/reduction ratio. Also, the image processing modules 38 that perform color conversion processing include an image processing module 38 that converts from an RGB color space into a CMY color space, an image processing module 38 that converts a CMY color space into an RGB color space, and an image processing module 38 that performs another type of color conversion using, for example, an L*a*b color space.

In the image processing module 38, in order to receive image data necessary for the image processing engine 38A to perform image processing in accordance with the unit-processing data amount, the controller 38B obtains image data in accordance with an amount of data to be read at one time (such an amount of data is hereinafter referred to as the "unit read data amount") from a module (e.g., the buffer module 40) positioned prior to the image processing module 38, and outputs image data received from the image processing engine 38A to a module (e.g., the buffer module 40) positioned subsequent to the image processing module 38 in accordance with an amount of data to be written at one time (such an amount of data is hereinafter referred to as the "unit write data amount"). In this case, if the image processing performed in the image processing engine 38A does not involve an increase or a decrease in the data amount, such as compression, the unit write data amount is equal to the unit-processing data amount. Instead of outputting the image data to an internal module, the controller 38B outputs a result of the processing executed by the image processing engine 38A to an external source of the image processing module 38. For example, if the image processing engine 38A performs image analyzing processing, such as skew-angle detection processing, the controller 38B outputs an image analyzing processing result, such as a skew-angle detection result, instead of image data. In the module library 36, the image processing modules 38 that perform, by using the image processing engines 38A, image processing operations whose types and contents are the same but whose unit-processing data amount, unit read data amount, and unit write data amount are different are also registered. For example, the image processing modules 38 that perform image rotation processing may include, not only an image processing module 38 whose unit-processing data amount is one frame of an image, as discussed above, but also an image processing module 38 whose unit-processing data amount is one line or plural lines of an image.

The programs of each of the image processing modules 38 registered in the module library 36 include programs corresponding to the image processing engine 38A and programs corresponding to the controller 38B. The programs of the controllers 38B are modularized. For the image processing modules 38 whose unit read data amounts are the same and whose unit write data amounts are the same, the programs corresponding to the controllers 38B are modularized (i.e., the same programs are used for the controllers 38B) regardless of the types or contents of image processing executed in the image processing engines 38A. Accordingly, a load experienced when developing the programs corresponding to the image processing modules 38 is reduced.

The image processing modules 38 include the following types of image processing modules 38. If the attributes of an input image are unknown, the unit read data amount and the unit write data amount are indefinite. In this case, the attributes of the input image data are first obtained, and the obtained attributes are substituted into a predetermined arithmetic expression. The arithmetic expression is then calculated, thereby determining the unit read data amount and the unit write data amount. In those types of image processing modules 38, there may be some image processing modules 38 whose unit read data amounts or unit write data amounts can be determined by using the same arithmetic expression. For such image processing modules 38, programs corresponding to the controllers 38B can be modularized. As discussed above, the image processing program set 34 of this exemplary embodiment may be implemented in various devices. However, the number or the types of image processing modules 38 registered in the module library 36 of the image processing program set 34 can be suitably added, deleted, or replaced in accordance with image processing which is necessary in a device implementing the image processing program set 34.

Figure 4B:
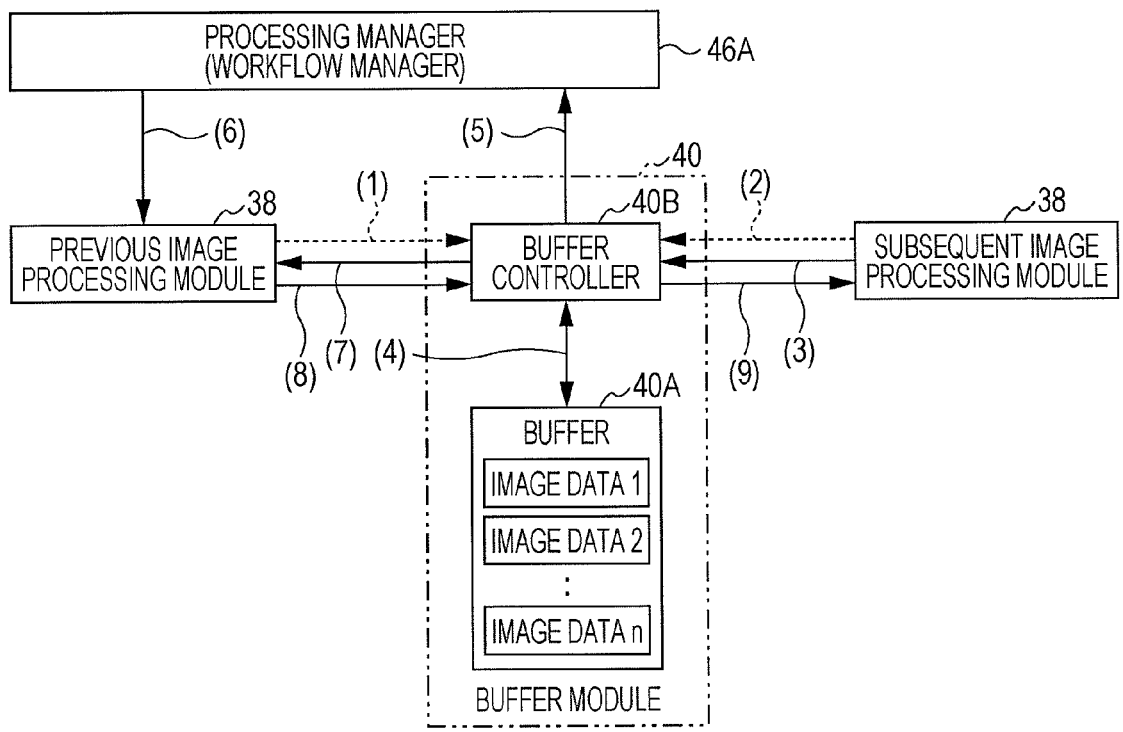

Each of the buffer modules 40 forming the image processor 50 includes, as shown in FIG. 4B by way of example, a buffer 40A and a buffer controller 40B. The buffer 40A is formed by a memory area which is secured in the memory 14 provided in the computer 10 through the use of the OS 30. The buffer controller 40B controls input and output of image data into and from modules which are positioned prior to and subsequent to the corresponding buffer module 40, and also controls the buffer 40A. The buffer controller 40B of each of the buffer modules 40 is also formed by a program executed by the CPU 12, and the program of the buffer controller 40B (which are shown as "buffer modules" in FIG. 1) is registered in the module library 36.

Image processing modes employed in the image processor 50 include a parallel processing mode and a serial processing mode. In the parallel processing mode, the image processing modules 38 perform image processing in parallel. In the serial processing mode, only one image processing module 38 performs image processing at one time, and also, the image processing modules 38 are serially switched to perform image processing. In this exemplary embodiment, when performing image processing in accordance with the parallel processing mode (such processing may be hereinafter simply referred to as "parallel image processing"), an image processor 50 used for parallel processing (hereinafter may be simply referred to as a "parallel image processor") is constructed. In contrast, when performing image processing in accordance with the serial processing mode (such processing may be hereinafter simply referred to as "serial image processing"), an image processor 50 used for serial processing (hereinafter may be simply referred to as a "serial image processor") is constructed. In this manner, image processing modes in the image processor 50 are switched. Details of the parallel processing mode and the serial processing mode will be given later.

In the serial processing mode, it is only one image processing module 38 that always performs image processing at one time. Accordingly, only one image processing module 38 accesses the buffer 40A of the buffer module 40. In contrast, in the parallel processing mode, all the image processing modules 38 simultaneously perform image processing, and it is possible that plural image processing modules 38 simultaneously access the buffer 40A of the buffer module 40. It is thus necessary to perform exclusive control on access to the buffer 40A. Accordingly, in this exemplary embodiment, buffer modules 40 with an exclusive control function used for parallel processing are provided, and buffer modules 40 without an exclusive control function used for serial processing are provided. In the module library 36, therefore, programs of the buffer modules 40 with an exclusive control function and programs of the buffer modules 40 without an exclusive control function are registered.

The processing construction unit 42 that constructs the image processor 50 in response to an instruction from the application programs 32 includes, as shown in FIG. 1, plural module generators 44. The plural module generators 44 correspond to different types of image processing operations, and upon being started, the plural module generators 44 generate different module sets including the image processing modules 38 and the buffer modules 40, which implement the corresponding types of image processing operations. The module generators 44 shown in FIG. 1 are associated with the types of image processing operations executed by the image processing modules 38 registered in the module library 36 on the basis of a one-to-one correspondence. However, each of the module generators 44 may be associated with image processing operations implemented by plural image processing modules 38 (e.g., skew correction processing including skew-angle detection processing and image rotation processing). If the required type of image processing includes a combination of plural types of image processing operations, the application programs 32 sequentially start the module generators 44 corresponding to the plural types of image processing operations. Upon being started by the application programs 32, the module generators 44 construct the image processor 50 that performs the required image processing.

In the processing manager library 47, as shown in FIG. 1, plural programs of processing managers 46 are registered. Each of the processing managers 46 includes a workflow manager 46A, a resource manager 46B, and an error handler 46C. The workflow manager 46A controls the execution of image processing performed in the image processor 50. The resource manager 46B manages the resources of the computer 10, such as the memory 14 and various files, used by the individual modules of the image processor 50. The error handler 46C handles errors occurring in the image processor 50. The processing managers 46 are broadly divided into a parallel processing manager 46-1 and a serial processing manager 46-2. The parallel processing manager 46-1 causes the processing construction unit 42 to construct a parallel image processor 50 including the buffer modules 40 with an exclusive control function and performs control such that the constructed image processor 50 executes image processing in the parallel processing mode. The serial processing manager 46-2 causes the processing construction unit 42 to construct a serial image processor 50 including the buffer modules 40 without an exclusive control function and performs control such that the constructed image processor 50 executes image processing in the serial processing mode. Hereinafter, when it is not necessary to specify whether the processing manager 46 is the parallel processing manager 46-1 or the serial processing manager 46-2, it is generically referred to as the "processing manager 46".

In FIG. 1, a program of only one parallel processing manager 46-1 and a program of only one serial processing manager 46-2 are shown. In the processing manager library 47, however, programs of plural parallel processing managers 46-1 that cause the parallel image processor 50 to perform different types of parallel processing operations may be registered. Similarly, programs of plural serial processing managers 46-2 that cause the serial image processor 50 to perform different types of serial processing operations may be registered. The above-described processing construction unit 42 includes a selection starter 45. The selection starter 45 selectively starts one of the processing managers 46 registered in the processing manager library 47 in response to an instruction to construct the image processor 50 from the application program 32.

The function of the selection starter 45 will be described below with reference to the block diagram of FIG. 2. The selection starter 45 includes a parallel-processing-degree calculator 45A, an overhead calculator 46B, a parallel-processing-performance determination unit 45C, and a start processor 45D.

The parallel-processing-degree calculator 45A calculates a value representing the degree by which at least two image processing modules 38 are operated in parallel (such a degree is hereinafter referred to as the "parallel-processing degree") when a parallel image processor 50 is constructed to perform parallel image processing. More specifically, the parallel-processing degree is a value representing a parallel-processing time for which at least two image processing modules 38 are operated in parallel.

The overhead calculator 45B calculates a value representing a control time necessary for performing overhead processing. Such a value is hereinafter referred to as an "overhead value". The overhead processing is processing which is not necessary for performing control to execute serial image processing (such control may be hereinafter referred to as the "serial processing control") but is necessary for performing control to execute parallel image processing (such control may be hereinafter referred to as "parallel processing control"). The overhead processing includes, for example, exclusive control and thread starting control. Details of the overhead processing will be discussed later.

It is not necessary that the parallel-processing degree or the overhead value be expressed in typical time units, such as msec or μsec, and may be any numeric value representing a length of time. In this exemplary embodiment, the value of the parallel-processing degree and the overhead value are compared to simply determine which is greater or smaller. Accordingly, if the value representing the parallel-processing degree and the overhead value are roughly the same, they are calculated to have the same value. Alternatively, instead of comparing the value of the parallel-processing degree with the overhead value to determine which is greater or smaller, each of the parallel-processing degree and the overhead value may be compared with a threshold. In this case, if the values representing the parallel-processing degree and the overhead value are roughly the same, they do not have to be calculated to have the same value.

The parallel-processing-performance determination unit 45C determines, on the basis of the parallel-processing degree and the overhead value, regarding whether the time necessary to complete parallel image processing to be performed in the image processor 50 would be shorter than the time necessary to complete serial image processing (such determination may be hereafter referred to as the "parallel-processing performance determination"), and outputs a determination result.

The start processor 45D selects, on the basis of the determination result output from the parallel-processing-performance determination unit 45C, the parallel processing manager 46-1 or the serial processing manager 46-2 so as to cause the selected processing manager 46 to perform parallel image processing or serial image processing.

Figure 12A:
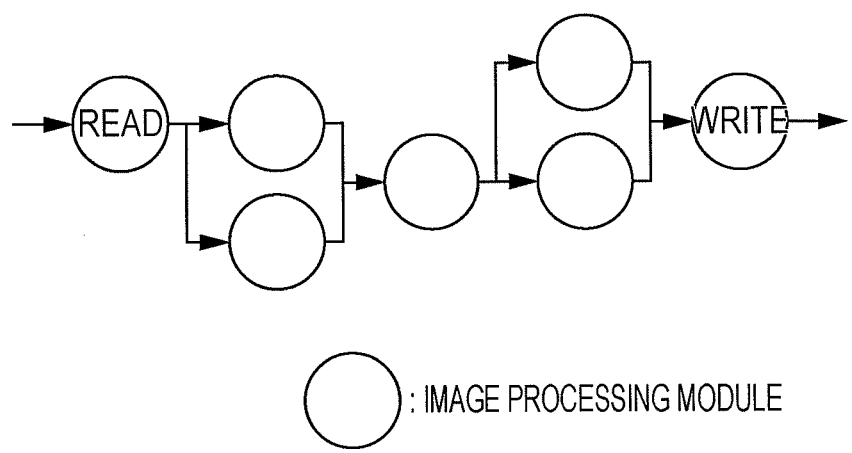
FIGS. 12A and 12B illustrate examples of connection modes of image processing modules.

For example, if the image processing modules 38 of the image processor 50 are connected, as shown in FIG. 12A (buffer modules 40 are not shown in FIG. 12A or 12B), there are a large number of branches in the processing, which increases the amount of exclusive control processing. As the exclusive control processing increases, the overhead value also increases. It is now assumed that, in order to perform image processing for one line of an image in a certain image processing module 38 (which is called as an "image processing module 38b"), image data representing one frame of an image subjected to image processing in an image processing module 38 (which is called as an "image processing module 38a") positioned prior to the image processing module 38b is required. In this case, even if parallel image processing is performed in the parallel processing mode, the image processing module 38b cannot start processing until the image processing module 38a finishes processing for image data representing one frame of an image. Thus, the processing of the image processor 50 is suspended. In this case, the processing wait degree (which will be discussed later) increases, thereby decreasing the time for which parallel processing is performed.

Figure 12B:
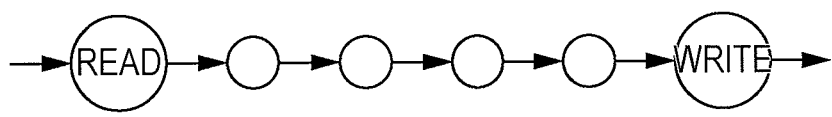

In contrast, if the processing load of each image processing module 38 forming the image processor 50 is light, as shown in FIG. 12B, and more specifically, if the time necessary for each image processing module 38 to execute processing for the unit-processing data amount (such processing is referred to as the "unit processing") is light, i.e., if the time necessary for executing the unit processing is short, the time for which parallel processing is performed is decreased. Thus, the parallel-processing degree is not increased even if parallel processing is performed in the parallel processing mode. In this case, the entire processing time may even increase depending on the overhead.

In this manner, even if it is possible to employ the parallel processing mode, some image processors 50 are not suitable for parallel processing, or high performance cannot be expected (the time necessary to perform in the parallel processing mode is not as short as that in the serial processing mode) depending on a combination of the image processing modules 38. In this exemplary embodiment, therefore, on the basis of the type of processing (by comparing the parallel-processing degree and the overhead value), the selection starter 45 selects and starts the parallel processing manager 46-1 or the serial processing manager 46-2. Details of the selection of the selection starter 45 will be discussed later.

The operation of this exemplary embodiment will be discussed below. If a device incorporating the image processing program set 34 encounters a situation in which certain image processing is required, such a situation is detected by a specific application program 32. The situations in which certain image processing is required may include situations where: a user gives an instruction to execute a job for reading an image by using an image reader, which serves as the image data supply unit 22, and for recording the image on a recording material by using an image recorder, which serves as the image output unit 24, for displaying such an input image on a display unit, which serves as the image output unit 24, for writing image data representing such an input image into a recording medium by using a writer, which serves as the image output unit 24, sending image data representing such an input image by using a sender, which serves as the image output unit 24, or for storing image data representing such an input image in an image storage unit, which serves as the image output unit 24; and a user gives an instruction to execute a job for receiving image data by using a receiver, which serves as the image data supply unit 22, for recording image data stored in an image storage unit, which serves as the image data supply unit 22, on the above-described recording medium, displaying the received image data on a display unit, writing the received image data into a recording medium, sending the received image data, or storing the received image data in an image storage unit. The situations in which certain image processing is required are not restricted to the situations described above. For example, the names of processing operations that can be executed by the application programs 32 in response to an instruction from a user may be displayed on the display unit 16, and the user may select a processing operation to be executed.

Figure 11:
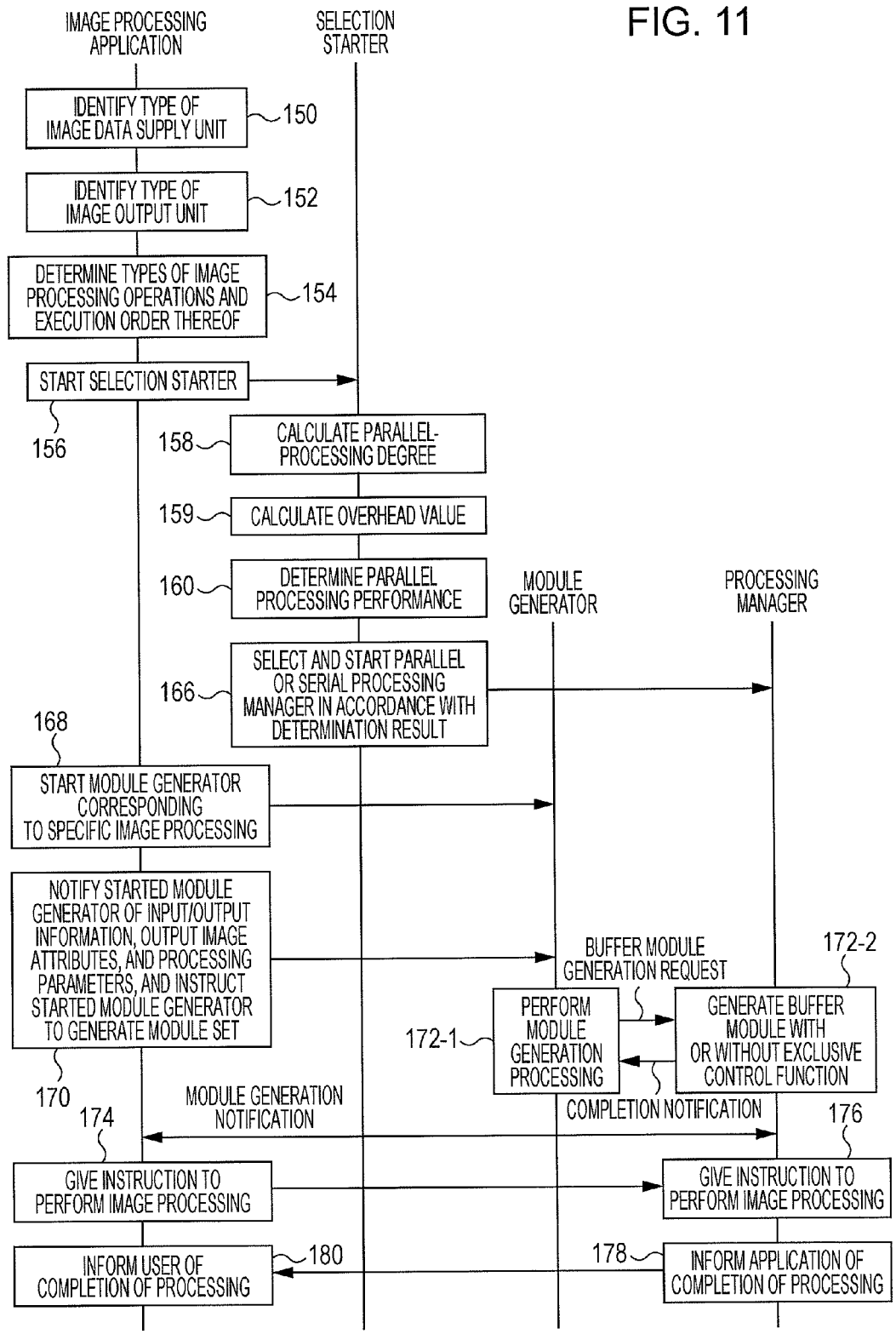
FIG. 11 is a sequence diagram illustrating an example of a series of processing operations from when an image processor is constructed until when image processing is executed.

Upon detecting a situation in which certain image processing is required, as described above, a certain application program 32 identifies the type of image data supply unit 22 that supplies image data to be processed (see also step 150 of FIG. 11). Then, the application program 32 identifies the type of image output unit 24 which receives the image data subjected to image processing (see also step 152 of FIG. 11).

Subsequently, the application program 32 identifies the content of image processing to be executed, and decomposes the image processing to be executed into a combination of image processing operations corresponding to the module generators 44. Then, the application program 32 determines the types of image processing operations necessary for implementing the image processing and also determines the execution order of the image processing operations (see also step 154 of FIG. 11). This determination may be made as follows. The types of image processing operations described above and the execution order of the image processing operations are registered in advance in association with a type of job that can be instructed by a user. When an instruction is given by a user, the application program 32 reads information corresponding to the type of job instructed by a user.

Then, the application program 32 starts the selection starter 45 of the processing construction unit 42 (see also step 156 of FIG. 11). The selection starter 45 first calculates the parallel-processing degree by using the parallel-processing-degree calculator 45A (see also step 158 of FIG. 11).

In this case, the value representing the parallel-processing degree is calculated by the following equation on the basis of the processing load of each image processing module 38 and the processing wait coefficient.

Parallel-processing degree=a total of values representing processing loads of the individual image processing modules 38×processing wait coefficient In this exemplary embodiment, the "processing load" of each image processing module 38 is represented by a load (time necessary for performing the unit processing), which has been measured in advance for each image processing module 38, by five levels (level 1 to level 5). As the level of the processing load increases, the time necessary for performing the unit processing increases. Alternatively, the processing load of each image processing module 38 may be represented by a value corresponding to the number of multiplications executed within the unit processing of each image processing module 38. This is because the processing load increases as the number of multiplications increases. Alternatively, the processing load may be represented by a value corresponding to the number of multiplications and additions executed within the unit processing of each image processing module 38. As the processing load increases (as the above-described value increases), the time taken for the plural image processing modules 38 to be operated in parallel increases. It is noted that information concerning the processing loads of the individual image processing modules 38 is stored in the storage unit 20 in advance.

Figure 13:
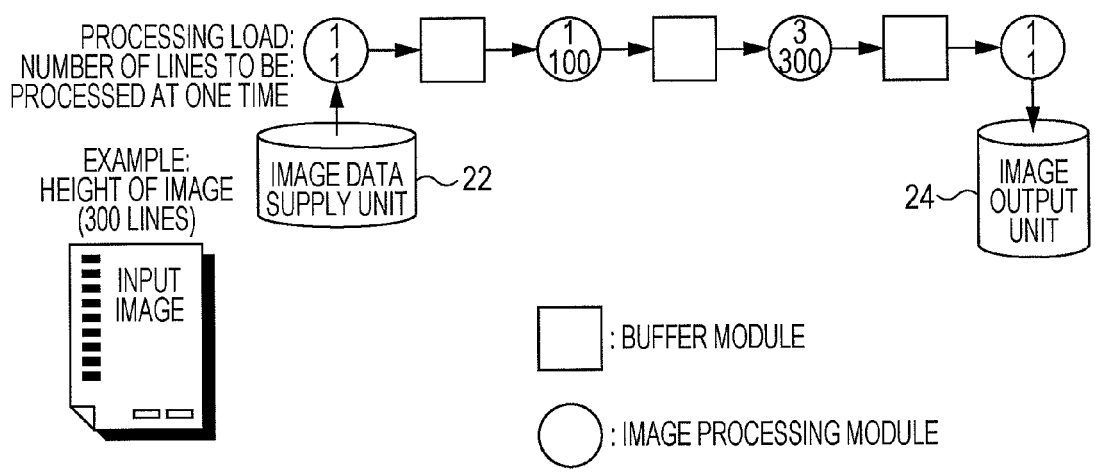
FIG. 13 illustrates a determination of the parallel processing performance of an image processor.

A specific example of the calculations of the parallel-processing degree, the processing wait degree, and the overhead value will be discussed with reference to FIG. 13. The values representing the processing loads in the example shown in FIG. 13 are added. Then, since the processing loads of the image processing modules 38 are 1, 1, 3, and 1 in the order from the upstream side to the downstream side of the connected image processing modules 38, the total value representing the processing loads of the image processing modules 38 results in 6 (1+1+3+1=6).

The "processing wait coefficient" is a value obtained by multiplying the processing wait degrees of the individual image processing modules 38. The processing wait degree of each image processing module 38 is a value representing how much a particular image processing module 38 requires data subjected to processing performed by the previous image processing module 38, in other words, how long the particular image processing module 38 is required to wait for a processing result output from the previous image processing module 38. The processing wait degree of each image processing module 38 is calculated by the following equation.

Processing wait degree of each image processing module 38=1−{unit-processing data amount/ (data amount of the entirety of an image to be processed×2)}

The reason for multiplying the data amount of the entire image to be processed by 2 in this equation is as follows. If the unit-processing data amount of a particular image processing module 38 is one frame, processing is suspended at a position of the particular image processing module 38 until the previous image processing module 38 finishes processing for one frame of the image. In other words, the particular image processing module 38 cannot restart processing until the previous image processing module 38 finishes the entire processing for the target image data, and thus, processing is suspended at the position of the particular image processing module 38. As a result, parallel processing is not performed. In this case, it is necessary to decrease the parallel-processing degree. Accordingly, 2 is multiplied as an adjustment value. The magnitude of the adjustment value may be determined empirically by experiment.

An example of calculation of the processing wait coefficient will be given below. In the example shown in FIG. 13, the unit-processing data amounts (shown as the "number of lines to be processed at one time" (line number unit)) of the individual image processing modules 38 are one line, 100 lines, 300 lines, and one line in the order from the upstream side to the downstream side of the connected image processing modules 38, and the data amount of the entire image to be processed (the height of the entire image represented by lines) is 300 lines. Accordingly, the processing wait degree of the first image processing module 38 (counted from the upstream side) is results in 599/600 (1−{1/(300×2)}=599/600). The processing wait degrees of the second, third, and fourth image processing modules 38 result in 5/6, 1/2, and 599/600, respectively. Thus, the processing wait coefficient is (599/600)×(5/6)×(1/2)×(599/600)≈0.42.

As a result, in the example shown in FIG. 13, the parallel-processing degree is calculated to be 6×0.42≈2.5.

After calculating the parallel-processing degree, the overhead calculator 45B calculates the overhead value (see also step 159 of FIG. 11). As the number of image processing modules 38 increases, the overhead value increases. Also, as the number of branches in processing increases, the amount of exclusive control increases, and thus, the overhead value increases. In this exemplary embodiment, therefore, a coefficient 1 and a coefficient 2 are set for serial connection and parallel connection, respectively. The coefficient is given to a target image processing module 38 in accordance with the connection mode between the target image processing module 38 and the previous image processing module 38 (two consecutive modules 38). Then, the coefficients are added as the overhead value. It is noted that in this example, if the target image processing module 38 is connected in parallel with the previous image processing module 38, the coefficient 2 is given to the target image processing module 38. In the example shown in FIG. 13, since all the image processing modules 38 are connected in serial with each other, the overhead value results in 4 (1+1+1+1=4).

In this example, the overhead value is calculated after the parallel-processing degree has been calculated. However, the overhead value may be calculated before the parallel-processing degree, or the overhead value and the parallel-processing degree may be calculated simultaneously.

Subsequently, the parallel-processing-performance determination unit 45C of the selection starter 45 determines the parallel processing performance on the basis of the calculated parallel-processing degree and overhead value (regarding whether the time necessary to complete parallel image processing to be performed in the image processor 50 would be shorter than the time necessary to complete serial image processing) (see also step 160 of FIG. 11). If the parallel-processing degree is greater than the overhead value, it is determined that the time necessary to complete parallel image processing to be performed in the image processor 50 would be shorter than the time necessary to complete serial image processing. If the parallel-processing degree is smaller than the overhead value, it is determined that the time necessary to complete parallel image processing to be performed in the image processor 50 would be longer than serial image processing. If the parallel-processing degree is equal to the overhead value, it is determined that the time necessary for performing parallel image processing in the image processor 50 is equal to that for serial image processing. In the example shown in FIG. 13, since the parallel-processing degree is 2.5 and the overhead value is 4, the parallel-processing degree is smaller than the overhead value. It is thus determined that the time necessary for performing parallel image processing would be longer than serial image processing. The parallel-processing-performance determination unit 45C outputs the determination result to the start processor 45D.

Another specific example will be given below with reference to FIGS. 14A through 14C.

Figure 14A:
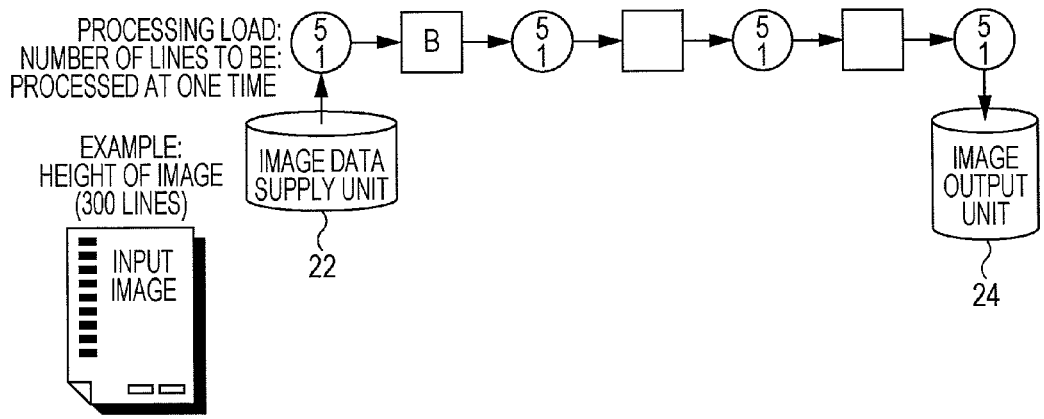
FIGS. 14A through 14C illustrate determinations of the parallel processing performance of image processors.

The parallel-processing degree and the overhead value in the image processor 50 shown in FIG. 14A are calculated as follows.

Parallel-processing degree=(5+5+5+5)×1=20

Overhead value=1+1+1+1=4

It is noted that the processing wait coefficient is calculated to be $(599/600) \times (599/600) \times (599/600) \times (599/600) \approx 1$.

In this example, since the parallel-processing degree is greater than the overhead value, the time necessary to complete parallel image processing would be shorter than the time necessary to complete serial image processing. That is, high performance can be expected by performing parallel processing.

Figure 14B:
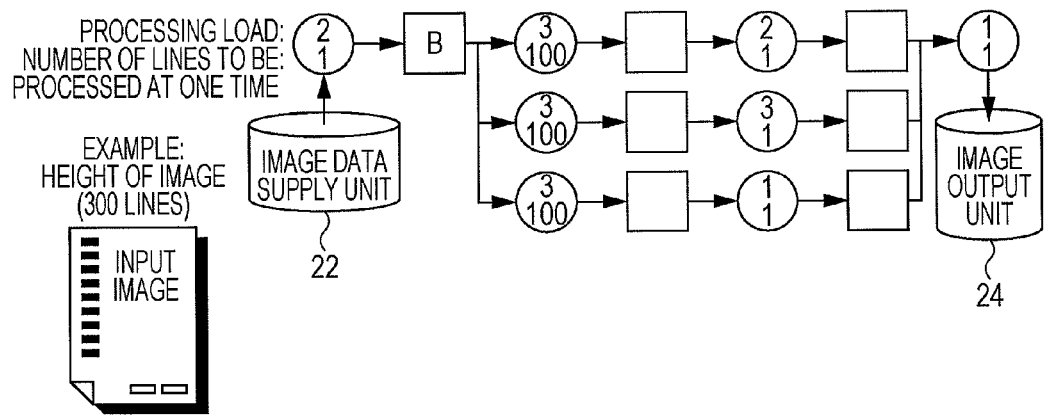

The parallel-processing degree and the overhead value in the image processor 50 shown in FIG. 14B are calculated as follows.

$$\text{Parallel-processing degree} = (2+3+3+3+2+3+1+1) \times \{(5/6) \times (5/6) \times (5/6)\} = 10.4$$

$$\text{Overhead value} = 1+2+2+2+1+1+1+1 = 11$$

It is noted that the processing wait degree of the image processing module 38 that processes one line at one time (unit-processing data amount is one line) is calculated to be $(599/600) \approx 1$.

In this example, since the parallel-processing degree is smaller than the overhead value, the time necessary to complete parallel image processing would be longer than the time necessary to complete serial image processing. That is, high performance cannot be expected even by performing parallel processing.

Figure 14C:
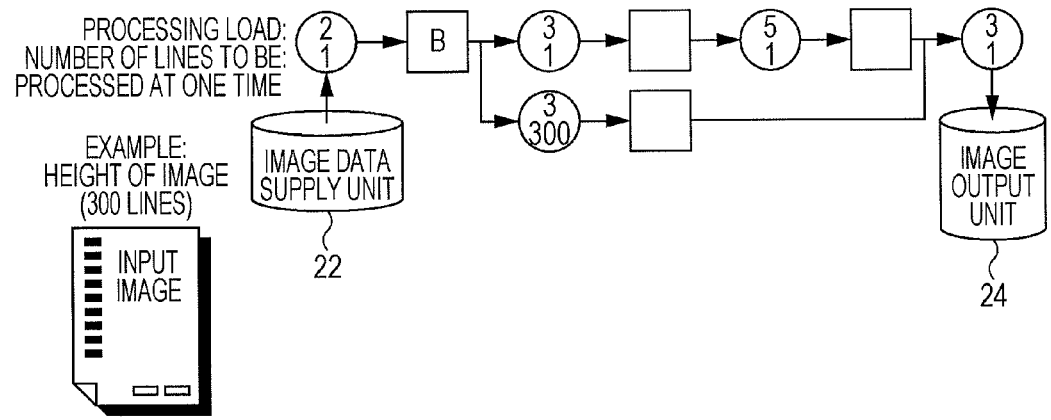

The parallel-processing degree and the overhead value in the image processor 50 shown in FIG. 14C are calculated as follows.

$$\text{Parallel-processing degree} = (2+3+3+5+3) \times 1/2 = 9.5$$

$$\text{Overhead value} = 1+2+2+1+1 = 7$$

As in the above-described examples, in this example, the processing wait degree of the image processing module 38 that processes one line at one time (unit-processing data amount is one line) is calculated to be $(599/600) \approx 1$.

In this example, since the parallel-processing degree is greater than the overhead value, the time necessary to complete parallel image processing would be shorter than the time necessary to complete serial image processing. That is, high performance can be expected by performing parallel processing.

The start processor 45D selects the parallel processing manager 46-1 or the serial processing manager 46-2 in accordance with the determination result input from the parallel-processing-performance determination unit 45C (see also step 166 of FIG. 11). If the determination result shows that the time necessary to complete parallel image processing would be shorter than the time necessary to complete serial image processing, the start processor 45D selects and starts the parallel processing manager 46-1 so as to cause the parallel processing manager 46-1 to perform parallel image processing. If the determination result shows that the time necessary to complete parallel image processing would be longer than the time necessary to complete serial image processing, the start processor 45D selects and starts the serial processing manager 46-2 so as to cause the serial processing manager 46-2 to perform serial image processing. If the determination result shows that the time necessary for performing image processing in the image processor 50 in accordance with the parallel processing mode is equal to that in accordance with the serial processing mode, any one of the parallel processing manager 46-1 and the serial processing manager 46-2 may be selected and started. Accordingly, it is determined in advance which processing manager is to be selected, and the parallel processing manager 46-1 or the serial processing manager 46-2 is selected and started in accordance with the setting.

Upon being started, the processing manager 46 enters an operation state and waits for a request or instruction (a request to generate a buffer module or an instruction to execute image processing, which will be discussed later) to be input from an external source.

After finishing starting the selection starter 45, the application program 32 identifies the type of image data supply unit 22 in step 150 of FIG. 11. If the type of image data supply unit identified in step 150 of FIG. 11 is a buffer region (part of the memory 14), the application program 32 supplies information concerning the buffer region which has been specified as the image data supply unit 22 to the processing manager 46 in operation. The application program 32 then requests the processing manager 46 to generate the buffer modules 40, which function as the image data supply unit 22 (not shown in FIG. 11). In this case, the processing manager 46 loads the program of the buffer controllers 40B into the memory 14 so that the CPU 12 can execute the programs of the buffer controllers 40B. The processing manager 46 also sets parameters so that the buffer controllers 40B can identify the buffer region (which has been specified as the image data supply unit 22) as the buffers 40A which have already been secured. The processing manager 46 thus generates the buffer modules 40, which function as the image data supply unit 22, and returns a response to the application program 32. If the processing manager 46 in operation is the parallel processing manager 46-1, the buffer modules 40 with an exclusive control function are generated. If the processing manager 46 in operation is the serial processing manager 46-2, the buffer modules 40 without an exclusive control function are generated.

If the type of image output unit identified in step 152 of FIG. 11 is a buffer region (part of the memory 14), the application program 32 supplies information concerning the buffer region which has been specified as the image output unit 24 to the processing manager 46 in operation. The application program 32 then requests the processing manager 46 to generate the buffer modules 40, which function as the image output unit 24 (not shown in FIG. 11). If the processing manager 46 in operation is the parallel processing manager 46-1, the buffer modules 40 with an exclusive control function are generated. If the processing manager 46 in operation is the serial processing manager 46-2, the buffer modules 40 without an exclusive control function are generated.

The application program 32 also starts the module generator 44 corresponding to the specific image processing on the basis of the type of image processing operation and the execution order determined in step 154 of FIG. 11 (see also step 168 of FIG. 11). The application program 32 then supplies information necessary for the module generator 44 to generate a module set and parameters used for image processing to be executed to the started module generator 44 (see also step 170 of FIG. 11), and then instructs the module generator 44 to generate a module set. The information for the module generator 44 to generate a module set includes input module identification (ID) information for identifying an input module that inputs image data to the module set, output module identification (ID) information for identifying an output module to which the module set outputs the image data, and input image attribute information concerning attributes of the image data to be input into the module set. If the required image processing includes plural types of image processing operations, the application program 32 carries out the following procedure. Upon receiving the completion of the generation of a module set from the started module generator 44, the application program 32 sequentially starts the other module generators 44 corresponding to the image processing operations, and sequentially supplies information necessary for the module generators 44 to generate module sets in ascending order of image processing operations (steps 168 and 170 of FIG. 11).

Concerning the above-described input module, the image data supply unit 22 serves as the input module for the first module set which is executed first in the execution order. For each of the second and subsequent module sets, the final module (normally buffer module 40) of the previous module set serves as the input module. Concerning the above-described output module, the image output unit 24 serves as the output module for the final module set which is executed last in the execution order. However, for the other module sets, an output module is undefined, and thus, the application program 32 does not specify the output module, and if necessary, the module generator 44 generates and sets the output module. Also, information concerning input image attributes and image processing parameters are registered in advance in association with the types of jobs that can be instructed by a user. When an instruction is given by a user, the application program 32 reads information corresponding to the type of job instructed by a user and identifies the corresponding input image attributes and image processing parameters. Alternatively, the user may specify input image attributes and image processing parameters.

The application program 32 starts the module generator 44 to cause it to perform module generation processing (see also step 172-1 of FIG. 11). In the module generation processing, the module generator 44 first obtains input image attribute information concerning the attributes of input image data to be input into the image processing module 38. If there is a buffer module 40 positioned prior to an image processing module 38 to be generated, the attributes of input image data may be obtained from the attributes of output image data output from the image processing module 38 positioned prior to the buffer module 40.

It is then determined on the basis of the attributes of the input image data whether it is necessary to generate an image processing module 38. For example, it is now assumed that the module generator 44 is a module generator which generates a module set for performing color conversion, and that a CMY color space is specified as the color space of output image data by the image processing parameters. In this case, if the input image data is found to be RGB color space data on the basis of the obtained input image attribute information, it is necessary to generate an image processing module 38 for performing color conversion from a RGB color space to a CMY color space. However, if the input image data is found to be CMY color space data, the attributes of the input image data match the attributes of the output image data in terms of the color space. Thus, it is not necessary to generate an image processing module 38 for performing color conversion processing.

If it is determined that it is necessary to generate an image processing module 38, a determination is made regarding whether it is necessary to generate a buffer module 40 positioned subsequent to the image processing module 38. If an output module (image output unit 24) is positioned subsequent to the image processing module 38 to be generated (e.g., see the final image processing module 38 in the image processor 50 shown in FIGS. 3A through 3C), or if an image processing module 38 performs image processing (e.g., analysis) on image data and outputs an image processing (analysis) result to another image processing module 38, such as the image processing module 38 for performing skew-angle detection processing in the image processor 50 shown in FIG. 3B, it is determined that it is not necessary to generate a buffer module 40. However, except for the above-described cases, it is determined that it is necessary to generate a buffer module 40. Then, the application program 32 requests the processing manager 46 in operation to generate a buffer module 40 to be connected to the image processing module 38 (subsequent to the image processing module 38).

Upon receiving a request to generate a buffer module 40, the processing manager 46 loads a program of the buffer controller 40B into the memory 14 so that the CPU 12 can execute the program of the buffer controller 40B, thereby generating the buffer module 40 (see also step 172-2 of FIG. 11). The processing manager 46 then returns a response to the module generator 44. If the processing manager 46 in operation is the parallel processing manager 46-1, the buffer module 40 with an exclusive control function is generated. If the processing manager 46 in operation is the serial processing manager 46-2, the buffer module 40 without an exclusive control function is generated.

Subsequently, the module generator 44 supplies information concerning a module (e.g., buffer module 40) positioned prior to the image processing module 38 (such a module may be referred to as the "previous module"), information concerning a buffer module 40 positioned subsequent to the image processing module 38 (such a module may be referred to as the "subsequent buffer module") (only when the subsequent buffer module 40 has been generated), attributes of input image data to be input into the image processing module 38, and processing parameters to the processing manager 46. Then, the module generator 44 selects, from among plural candidate modules that are registered in the module library 36 and that can be used as the image processing module 38, the image processing module 38 that matches the obtained attributes of the input image data and the processing parameters to be executed in the image processing module 38. The module generator 44 then loads the program of the selected image processing module 38 into the memory 14 so that the CPU 12 can execute the program, and sets parameters that enable the controller 38B of the image processing module 38 to identify the modules positioned prior to and subsequent to the image processing module 38. As a result, the image processing module 38 is generated.

It is now assumed that the module generator 44 is a module generator that generates a module set for performing color conversion, and that a CMY color space is specified as the color space of output image data by the image processing parameters and the input image data is RGB color space data. In this case, from among plural image processing modules 38 that are registered in the module library 36 and that perform various types of color conversion processing operations, the image processing module 38 that performs RGB→CMY color space conversion is selected and generated. If the image processing module 38 is an image processing module that performs enlargement/reduction processing and if the specified enlargement/reduction ratio is other than 50%, the image processing generator 38 that performs enlargement/reduction processing with a specified enlargement/reduction ratio is selected and generated. If the specified reduction ratio is 50%, the image processing module 38 that performs reduction processing with a reduction ratio 50%, i.e., the image processing module 38 that reduces input image data by 50% by sampling every other pixel, is selected and generated.

The selection of the image processing module 38 is not restricted to the above-described examples. For example, the unit-processing data amount in the image processing performed by the image processing engines 38A may be different among the image processing modules 38. Such image processing modules 38 may be registered in the module library 36. Then, the image processing module 38 having a suitable unit-processing data amount is selected in accordance with the operating environments, such as the size of a memory area which can be assigned to the image processor 50. For example, as the size of the memory area decreases, the image processing module 38 having a smaller unit-processing data amount is selected. Alternatively, the application program 32 or a user may select the image processing module 38.

Upon completion of the generation of the image processing module 38, a set of the ID of the subsequent buffer module 40 and the ID of the generated image processing module 38 is informed to the processing manager 46 in operation. Any type of information may be given to those IDs as long as the individual modules can be uniquely identified. For example, the numbers assigned to the individual modules in the order in which the modules have been generated, or addresses assigned to the objects forming the buffer module 40 and the image processing module 38 in the memory 14 may be used. If the module generator 44 generates a module set for performing image processing implemented by plural image processing modules 38 (e.g., skew correction processing implemented by the image processing module 38 that performs skew-angle detection processing and the image processing module 38 that performs image rotation processing), the above-described processing is repeated so as to generate a module set including two or more image processing modules 38. The individual module generators 44 that are sequentially started by the application program 32 construct the image processor 50 that performs required image processing, as shown in FIGS. 3A through 3C.

Upon completion of the construction of the image processor 50 that performs required image processing, the application program 32 instructs the processing manager 46 in operation to execute image processing by use of the image processor 50 (see also step 174 of FIG. 11). In response to an instruction from the application program 32, the processing manager 46 causes the CPU 12 to execute, as threads, the programs of the individual modules forming the image processor 50 that are loaded into the memory 14 through the use of the OS 30 (see also step 176 of FIG. 11). If the processing manager 46 in operation is the parallel processing manager 46-1, the parallel processing manager 46-1 causes the CPU 12 to execute, as independent threads, the programs of the individual modules forming the image processor 50 so that the individual image processing modules 38 perform image processing in parallel. If the processing manager 46 in operation is the serial processing manager 46-2, the serial processing manager 46-2 causes the CPU 12 to execute, as a single thread, the programs of the individual modules forming the image processor 50. Instead of threads, the processing manager 46 may cause the CPU 12 to execute the programs of the individual modules as processes or objects.

As described in the operation of the selection starter 45, exclusive control to be performed when plural image processing modules 38 are connected in parallel causes overhead. Not only exclusive control, but also thread starting control causes overhead. More specifically, in the serial processing mode, the image processing modules 38 are started one by one in the order in which they are connected from the upstream side to the downstream side. In contrast, in the parallel processing mode, it is necessary to determine which thread is to be started in order to perform parallel processing. This is not necessary in the serial processing mode. Accordingly, thread starting control causes overhead in the parallel processing mode. In the above-described example, the overhead value is calculated in accordance with the connection mode. If the thread starting control is also considered toward calculating the overhead value, the number of image processing modules 38 forming the image processor 50 may be used as a parameter for determining the overhead value. As the number of image processing modules 38 increases, the overhead value increases.

When the programs of the image processing modules 38 are executed as threads, the controller 38B of each of the image processing modules 38 initializes the image processing module 38 including that controller 38B. The initialization of the image processing module 30 is performed as follows. The controller 38B first determines on the basis of the parameters set by the module generator 44 whether there is a module positioned prior to the image processing module 38 (hereinafter may referred to as the "previous module"). If there is no previous module positioned prior to the image processing module 38, the controller 38B does not execute any processing. If there is a previous module and if such a previous module is other than the buffer module 40, e.g., if the previous module is the image data supply unit 22 or a specific file, the controller 38B initializes such a module. If the previous module is a buffer module 40, the controller 38B identifies the unit read data amount, which is the data amount by which the image processing module 38 obtains image data from the previous buffer module 40 at one time.

There is only one type of unit read data amount if the number of previous buffer modules 40 is one. However, as in the image processing module 38 that performs image composing processing in the image processor 50 shown in FIG. 3C, if the number of previous buffer modules 40 is more than one and if the image processing engine 38A performs image processing by using image data obtained from each of the previous buffer modules 40, the unit read data amount corresponding to each of the previous buffer modules 40 is determined by the type and the content of image processing to be performed in the image processing engine 38A and the number of previous buffer modules 40. Then, the controller 38B of the image processing module 38 reports the identified unit read data amounts to all the previous buffer modules 40 so that the unit read data amount can be set in the corresponding buffer modules 40 (see also (1) of FIG. 4A).

Then, the controller 38B of the image processing module 38 determines whether there is a module disposed at a position after the image processing module 38 (hereinafter may be referred to as the "subsequent module"). If there is a subsequent module and if such a subsequent module is other than a buffer module 40, e.g., if the subsequent module is the image output unit 24 or a specific file, the controller 38B performs initialization processing if necessary. For example, if the subsequent module is the image output unit 24, the controller 38B informs the image output unit 24 that image data is output by an amount corresponding to the unit write data amount. If the subsequent module is a buffer module 40, the controller 38B identifies the data amount by which image data is written at one time (unit write data amount), and sets the unit write data amount in the subsequent buffer module 40 (see also (2) of FIG. 4A). Then, the controller 38B informs the processing manager 46 of the completion of the initialization of the image processing module 38.

If the programs of the buffer controllers 40B of the buffer modules 40 are executed as threads, the buffer controller 40B of each of the buffer modules 40 initializes the buffer module 40 including that buffer controller 40B. More specifically, upon receiving information concerning the unit write data amount from the previous image processing module 38 or upon receiving information concerning the unit read data amount from the subsequent image processing module 38, the buffer module 40 stores the unit write data amount or the unit read data amount (see also (1) and (2) of FIG. 4B).

Upon receiving the unit write data amount and the unit read data amount from all the image processing modules 38 connected to the buffer module 40, the buffer module 40 determines, on the basis of the unit write data amount and the unit read data amount which are set in the image processing modules 38 connected to the buffer module 40, the size of a unit buffer region, which is a management unit of the buffer 40A of the buffer module 40, and stores the determined size of the buffer region therein. As the size of the unit buffer region, the maximum value of the unit write data amount and the unit read data amounts set in the image processing modules 38 is suitably used. Alternatively, the unit write data amount may be set, or the unit read data amount may be set (if plural image processing modules 38 are disposed after the buffer module 40, the maximum value of the unit read data amounts which are set in the image processing modules 38 may be set). Alternatively, the lowest common multiple of the unit write data amount and the maximum value of the unit read data amounts may be set. If the lowest common multiple is smaller than a predetermined value, the lowest common multiple may be set. If the lowest common multiple is equal to or greater than the predetermined value, another value (e.g., the maximum value of the unit write data amount and the unit read data amounts, the unit write data amount, or the maximum value of the unit read data amounts) may be set.

If the buffer module 40 is a buffer module 40 which serves as the image data supply unit 22 or the image output unit 24, the memory area used as the buffer 40A of the buffer module 40 has already been secured. Accordingly, the size of the unit buffer region determined as described above is changed to the size of the memory area used as the buffer 40A of the buffer module 40. The buffer module 40 also generates a valid data pointer corresponding to each of the image processing modules 38 positioned subsequent to the buffer module 40, and initializes the generated valid data pointers. The valid data pointer is a pointer indicating the head position (next read start position) and the end position of each of image data elements (valid data elements) which have been written into the buffer 40A of the buffer module 40 by the previous image processing modules 38 and which have not been read by the corresponding subsequent image processing modules 38. When initializing the buffer module 40, specific information indicating that there is no valid data in that buffer module 40 is set. However, if the buffer module 40 is a buffer module 40 which serves as the image data supply unit 22, image data to be processed may have already been stored in the memory area used as the buffer 40A of the buffer module 40, and in this case, the head position and the end position of the image data are set in the valid data pointer corresponding to each of the subsequent image processing modules 38. As a result of performing the above-described processing, the initialization of the buffer module 40 is completed, and the buffer controller 40B informs the processing manager 46 of the completion of the initialization.

Figure 10A:
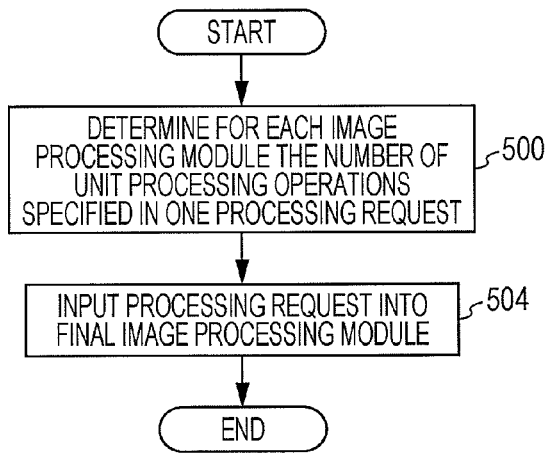
FIGS. 10A through 10D are flowcharts illustrating block-unit serial control processing executed by a workflow manager of a serial processing manager.
Figure 10B:
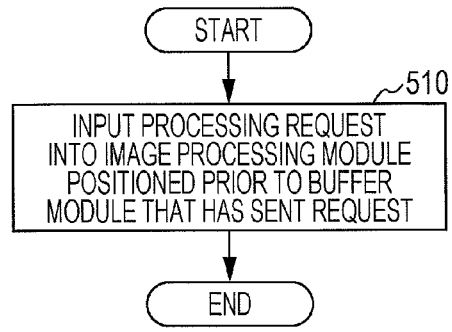

Upon receiving information concerning the completion of the initialization from all the modules forming the image processor 50, the processing manager 46 starts threads (or processes or objects) that execute the program of the workflow manager 46A and instructs the workflow manager 46A to execute image processing by using the image processor 50. The types of processing operations performed by the workflow managers 46A of the processing managers 46 whose programs are registered in the processing manager library 47 are different from each other. If the processing manager 46 in operation is the parallel processing manager 46-1, the workflow manager 46A performs parallel control processing, such as that shown in FIG. 8A or 8B. If the processing manager 46 in operation is the serial processing manager 46-2, the workflow manager 46A performs block-unit serial control processing, such as that shown in FIG. 10A or 10B. A processing request is input into the image processing module 38 forming the image processor 50, and then, the image processor 50 performs image processing under the control of the above-described parallel control processing or serial control processing. Before describing the operation performed by the entire image processor 50, processing performed by the buffer controller 40B of each of the buffer modules 40 and processing performed by the controller 38B of each of the image processing modules 38 are sequentially described.

In this exemplary embodiment, when the image processing module 38 writes image data into the subsequent buffer module 40, a write request is input from the image processing module 38 into the subsequent buffer module 40. When the image processing module 38 reads image data from the previous buffer module 40, a read request is input from the image processing module 38 into the previous buffer module 40. If a write request is input from the previous image processing module 38 into the buffer module 40 with an exclusive control function (and if a time-out occurs in a timer, which will be discussed later), the following data write processing is executed by the buffer controller 40B.

In the data write processing performed by the buffer controller 40B of the buffer module 40 with an exclusive control function, the buffer controller 40B first determines whether access is being made to the buffer 40A of the buffer module 40. When the image processing modules 38 forming the image processor 50 perform image processing in parallel, the reading of data from the buffer 40A is also performed asynchronously with the writing of data into the buffer 40A. Accordingly, if access is being made to the buffer 40A, the buffer controller 40B stores write request information which has been input into the buffer 40A in a work memory, and starts a timer, thereby temporarily discontinuing the data writing processing. In the following processing, the input write request information is to be processed. If a time-out occurs in the timer so as to restart data write processing, write request information that has been input and stored in a work memory is extracted from the work memory and is subjected to the following processing.

If access is not being made to the buffer 40A, in the data write processing, the buffer controller 40B informs the resource manager 46B of the unit write data amount as the size of a memory area to be secured, and obtains, via the resource manager 46B of the processing manager 46 in operation, a memory area used for writing data (write buffer region, see also FIG. 5B), which may be referred to as the "write memory area". Then, the buffer controller 40B determines whether there is a unit buffer region having a space which is equal to or greater than the unit write data amount in the storage unit buffer region forming the buffer 40A of the buffer module 40. In other words, the buffer controller 40B determines whether there is a unit buffer region into which image data having the unit write data amount can be written. In the buffer module 40 generated by the module generator 44, a memory area (unit buffer region) used as the buffer 40A is not initially secured. Every time there is a shortage of a memory area, a memory area is secured as the unit buffer region. Accordingly, when a write request is input into the buffer module 40 for the first time, there is no memory area (unit buffer region) used as the buffer 40A. It is thus determined that there is no unit buffer region having a space which is equal to or greater than the unit write data amount. Even after the unit buffer region used as the buffer 40A is secured as a result of the following processing, it is determined that there is no such unit buffer region if the space in the unit buffer region has become smaller than the unit write data amount as a result of writing image data into the unit buffer region.

If it is determined that there is no unit buffer region having a space which is equal to or greater than the unit write data amount, the buffer controller 40B informs the resource manager 46B of the size of a memory area (unit buffer region) to be secured. The buffer controller 40B then obtains a memory area (unit buffer region used for storing image data) used as the buffer 40A via the resource manager 46B. Then, the buffer controller 40B notifies the image processing module 38 that has sent a write request of the head address of the write buffer region obtained as described above, and also requests the image processing module 38 to write the subject image data from the head address. As a result of this processing, the image processing module 38 writes the subject image data into the write buffer region from the head address (see also FIG. 5B).

If the size of the unit buffer region is not an integral multiple of the unit write data amount, as a result of repeatedly writing the unit write data amount of image data into the buffer 40A (unit buffer region), the remaining space in the unit buffer region may become smaller than the unit write data amount, as shown in FIG. 5A. In this case, the unit write data amount of image data is stored in more than one unit buffer regions. In this exemplary embodiment, a memory area used as the buffer 40A is secured in units of unit buffer regions, and thus, unit buffer regions which are secured at different times are not necessarily continuous regions in the real memory (memory 14). In this exemplary embodiment, however, image data is temporarily written into a write buffer region, which is secured separately from storage buffer regions. Accordingly, image data that has temporarily been written into the write buffer region is copied into a single or plural storage unit buffer regions, as shown in FIG. 5C. Thus, regardless of whether or not the image data is written into plural unit buffer regions, it is sufficient that information concerning the head address of the write buffer region (write area) be supplied to the image processing module 38 that has sent a write request. With this arrangement, an interface with the image processing module 38 can be simplified.

If the buffer module 40 is a buffer module that has been generated by the application program 32, that is, if the memory area used as the buffer 40A has already been secured, the buffer controller 40B notifies the image processing module 38 of the address of the secured memory area as the address of the write buffer region, and causes the image processing module 38 to write image data into the memory area. Upon completion of the writing of the image data into the write buffer region, attribute information is added to the image data written into the write buffer region, and the image data is then written into a storage buffer region. If the size of a space in the unit buffer region is smaller than the unit write data amount, the image data written into the write buffer region is divided into smaller data elements and the divided data elements are written into plural storage unit buffer regions, as shown in FIG. 5C.

Then, among the valid data pointers corresponding to the individual image processing modules 38 positioned subsequent to the buffer module 40, the pointer indicating the end position of the valid data is updated so that the end position of the valid data indicated by the pointer is moved forward by an amount equal to the unit write data amount (see also FIG. 5C). Also, the buffer controller 40B causes the resource manager 46B to release the memory area secured as the write buffer region, and temporarily discontinues the data write processing. It is noted that the write buffer region may be secured when the buffer module 40 is initialized, and may be released when the buffer module 40 is erased.

The above-described data write processing is performed by the buffer controller 40B of the buffer module 40 with an exclusive control function which is integrated into the parallel image processor 50. The data write processing performed by the buffer controller 40B of the buffer module 40 without an exclusive control function integrated into the serial image processor 50 is the same as the above-described data write processing, except that the exclusive control processing is not performed, i.e., the buffer controller 40B does not follow the following procedure: the buffer controller 40B determines whether access is being made to the buffer 40A, and if so, write request information is stored, and a timer is started; and if a time-out occurs in the timer, the buffer controller 40B determines again whether access is being made to the buffer 40A. The exclusive control processing, which is not necessary in the serial processing, is omitted in the data write processing in the buffer module 40 without an exclusive control function, thereby improving processing efficiency.

A description will now be given of data read processing executed by the buffer controller 40B of the buffer module 40 with an exclusive control function when a read request is input from the subsequent image processing module 38 into the buffer module 40 (and when a time-out occurs in a timer, which will be discussed later).

In the data read processing performed by the buffer controller 40B of the buffer module 40 with an exclusive control function, the buffer controller 40B determines whether the start of the data read processing is due to the input of a read request from the subsequent image processing module 38. If the result of this determination is YES, information concerning the read request input from the subsequent image processing module 38 is registered at the end of a read queue. The buffer controller 40B then determines whether access is being made to the buffer 40A of the buffer module 40. If access is being made to the buffer 40A, the buffer controller 40B determines whether read request information is registered in the read queue. If read request information is not registered in the read queue, the buffer controller 40B terminates the data read processing. If read request information is registered in the read queue, the buffer controller 40B starts a timer and discontinues the data read processing. If a time-out occurs in the timer, the buffer controller 40B restarts the data read processing to extract the read request which has been registered in the read queue and which has not been processed, and performs processing in accordance with the read request.

Because of this exclusive control in the data read processing and in the above-described data write processing, the occurrence of possible inconveniences when plural requests are simultaneously or substantially simultaneously input into a single buffer module 40 can be avoided. This makes it possible for the CPU 12 of the computer 10 to execute threads corresponding to the individual modules of the parallel image processor 50 in parallel.

If the buffer controller 40B determines that access is not being made to the buffer 40A of the buffer module 40, read request information registered at the head of the read queue is extracted. Then, on the basis of request source ID information contained in the extracted read request information, the buffer controller 40B identifies the image processing module 38 that has sent a read request, and also identifies the unit read data amount set by the image processing module 38. The buffer controller 40B also identifies, on the basis of the valid data pointer corresponding to the image processing module 38, the head position and the end position of the valid data in the buffer 40A. Then, the buffer controller 40B determines, on the basis of the head position and the end position of the valid data, whether the valid data corresponding to the image processing module 38 (image data that can be read by the image processing module 38) is equal to or greater than the unit read data amount.

If the valid data corresponding to the image processing module 38 is smaller than the unit read data amount, a determination is further made regarding whether or not the end of the valid data that can be read by the image processing module 38 coincides with the end of the image data to be processed. If the valid data corresponding to the image processing module 38 is equal to or greater than the unit read data amount, or if the end of the valid data coincides with the end of the image data to be processed even if the valid data corresponding to the image processing module 38 is smaller than the unit read data amount, the buffer controller 40B performs the following processing. The buffer controller 40B informs the resource manager 46B of the unit read data amount corresponding to the image processing module 38 as the size of a memory area to be secured, and also requests the resource manager 46B to secure a memory area to be used for reading data (read buffer region, see also FIG. 6B) and obtains a read buffer region via the resource manager 46B.

Then, the buffer controller 40B reads the unit read data amount of valid data from the buffer 40A and writes the valid data into the read buffer region. The buffer controller 40B then informs the image processing module 38 of the head address of the read buffer region as the head address of the read area, and also requests the image processing module 38 to read the image data from the head address. Upon receiving this request, the image processing module 38 reads the image data from the read area (read buffer region) from the head address. If the end of the valid data coincides with the end of the image data to be processed, when sending a request to read the image data, the buffer controller 40B informs the image processing module 38, together with the size of the image data to be read, that the end of the valid data coincides with the end of the image data to be processed. If the buffer module 40 is a buffer module that has been generated by the application program 32, the memory area (a set of unit buffer regions) used as the buffer 40A is a continuous region. Accordingly, the securing of a read buffer region and the writing of image data into the read buffer region may be omitted, and then, the image processing module 38 may directly read the image data from the unit buffer region.

Figure 6C:
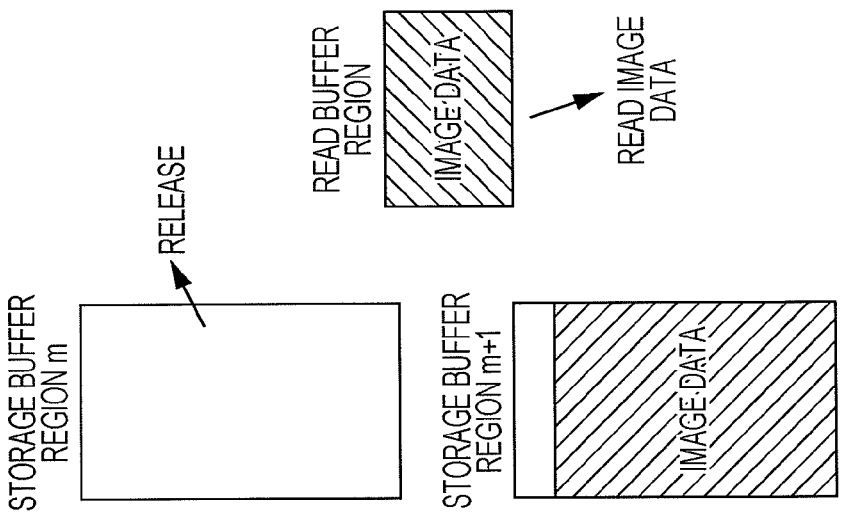
FIGS. 6A through 6C schematically illustrate image data to be read are stored in plural storage unit buffer regions.
Figure 6B:
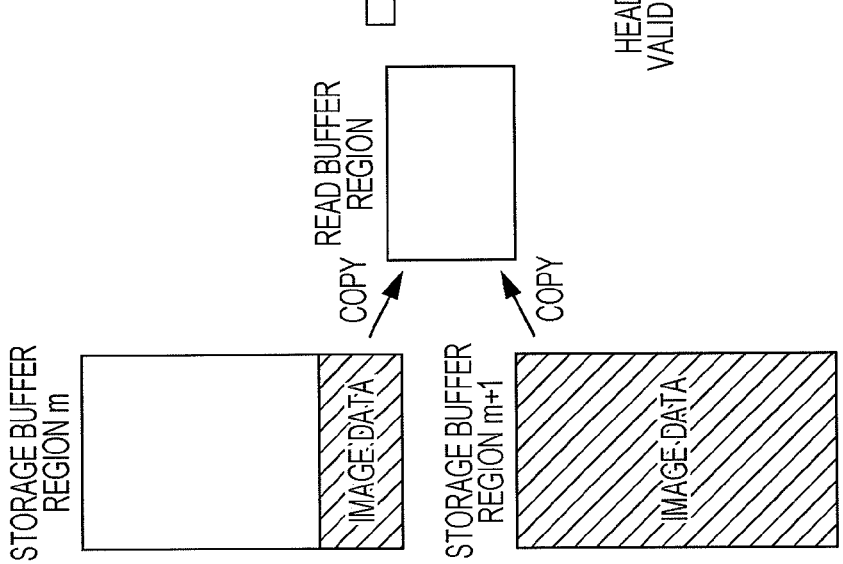
Figure 6A:
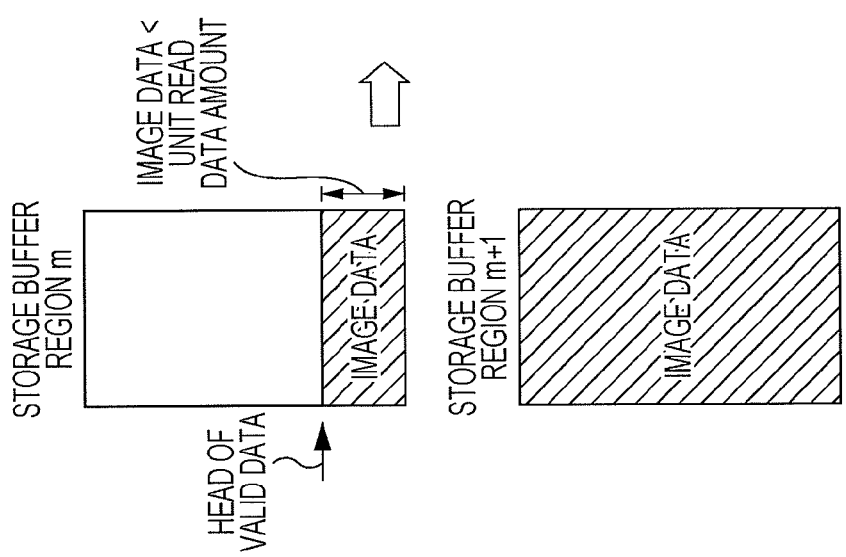

As shown in FIG. 6A, if the valid data is stored in more than one unit buffer region because the amount of image data, which is the head portion of the valid data, stored in the unit buffer region is smaller than the unit read data amount, the valid data to be read is not necessarily stored in continuous regions in the real memory (memory 14). However, in the data read processing, even in this case, as shown in FIGS. 6B and 6C, the image data to be read is temporarily written into the read buffer region, and is then read from the read buffer region. Thus, regardless of whether or not the image data to be read is written into plural unit buffer regions, it is sufficient that information concerning the head address of the read area be supplied to the image processing module 38 that has sent a read request. With this arrangement, an interface with the image processing module 38 can be simplified.

Upon receiving a reading completion notification from the image processing module 38, the buffer controller 40B informs the resource manager 46B of the head address and the size of the memory area secured as the read buffer region, and causes the resource manager 46B to release the memory area. As in the write buffer region, the read buffer region may be secured when the buffer module 40 is initialized, and may be released when the buffer module 40 is erased. Additionally, the pointer indicating the head position of the valid data is updated so that the head position of the valid data indicated by the pointer is moved forward by an amount equal to the unit read data amount (see also FIG. 6C).

Subsequently, by referring to each of the valid data pointers corresponding to the subsequent image processing modules 38, the buffer controller 40B determines whether, among the unit buffer regions forming the buffer 40A, a unit buffer region from which the image data has been completely read by the corresponding image processing module 38, i.e., a unit buffer region in which valid data is not stored, has appeared as a result of updating the pointers. If the result of this determination is NO, the buffer controller 40B performs read-queue check processing. More specifically, the buffer controller 40B checks whether read request information is registered in the read queue, and then, completes the data read processing. If the result of this determination is YES, the buffer controller 40B causes the resource manager 46B to release the corresponding unit buffer region, and then, performs the above-described read-queue check processing. The buffer controller 40B then completes the data read processing.

On the other hand, if the amount of valid data which is stored in the buffer 40A and which can be read by the image processing module 38 is smaller than the unit read data amount, and if the end of the valid data does not coincide with the end of the image data to be processed (if valid data is not detected in (4) of FIG. 4B), the buffer controller 40B outputs a data request to request the workflow manager 46A to send new image data to the workflow manager 46A (see also (5) of FIG. 4B), and then registers again the read request information which has been extracted from the read queue at the head or the end of the read queue. The buffer controller 40B then performs the read-queue check processing and completes the data read processing. In this case, a processing request is input into the image processing module 38 positioned prior to the buffer module 40 by the workflow manager 46A. Therefore, the corresponding read request information is stored in the read queue and is regularly extracted so that the execution of the requested processing is attempted until it is determined that the amount of valid data to be read is equal to or greater than the unit read data amount or the end of the valid data coincides with the end of the image data to be processed.

Upon receiving a data request from the buffer module 40, the workflow manager 46A inputs a processing request into the image processing module 38 positioned prior to the buffer module 40 (see also (6) of FIG. 4B). In response to this processing request as a trigger, the controller 38B of the image processing module 38 performs the corresponding processing so that the image processing module 38 is ready to write image data into the buffer module 40. Then, the image processing module 38 inputs a write request into the buffer module 40 so as to cause the buffer module 40 to perform the above-described data write processing. Then, the image data is written into the buffer 40A of the buffer module 40 from the previous image processing module 38 (see also (7) and (8) of FIG. 4B). This makes it possible for the subsequent image processing module 38 to read the image data from the buffer 40A (see also (9) of FIG. 4B). Details of this processing will be discussed later.

The above-described data read processing is performed by the buffer controller 40B of the buffer module 40 with an exclusive control function which is integrated into the parallel image processor 50. The data read processing performed by the buffer controller 40B of the buffer module 40 without an exclusive control function which is integrated into the serial image processor 50 is the same as the above-described data read processing, except that the exclusive control processing is not performed, i.e., the buffer controller 40B does not follow the following procedure: the buffer controller 40B determines whether access is being made to the buffer 40A, and also determines whether read request information is registered in a queue; if the two conditions are satisfied, a timer is started; if a time-out occurs in the timer, the buffer controller 40B determines again whether access is being made to the buffer 40A; and after finishing processing a single read request, the buffer controller 40B checks again whether read request information is stored in the queue. The exclusive control processing, which is not necessary in the serial processing, is omitted in the data read processing in the buffer module 40 without an exclusive control function, thereby improving processing efficiency.

Figure 7:
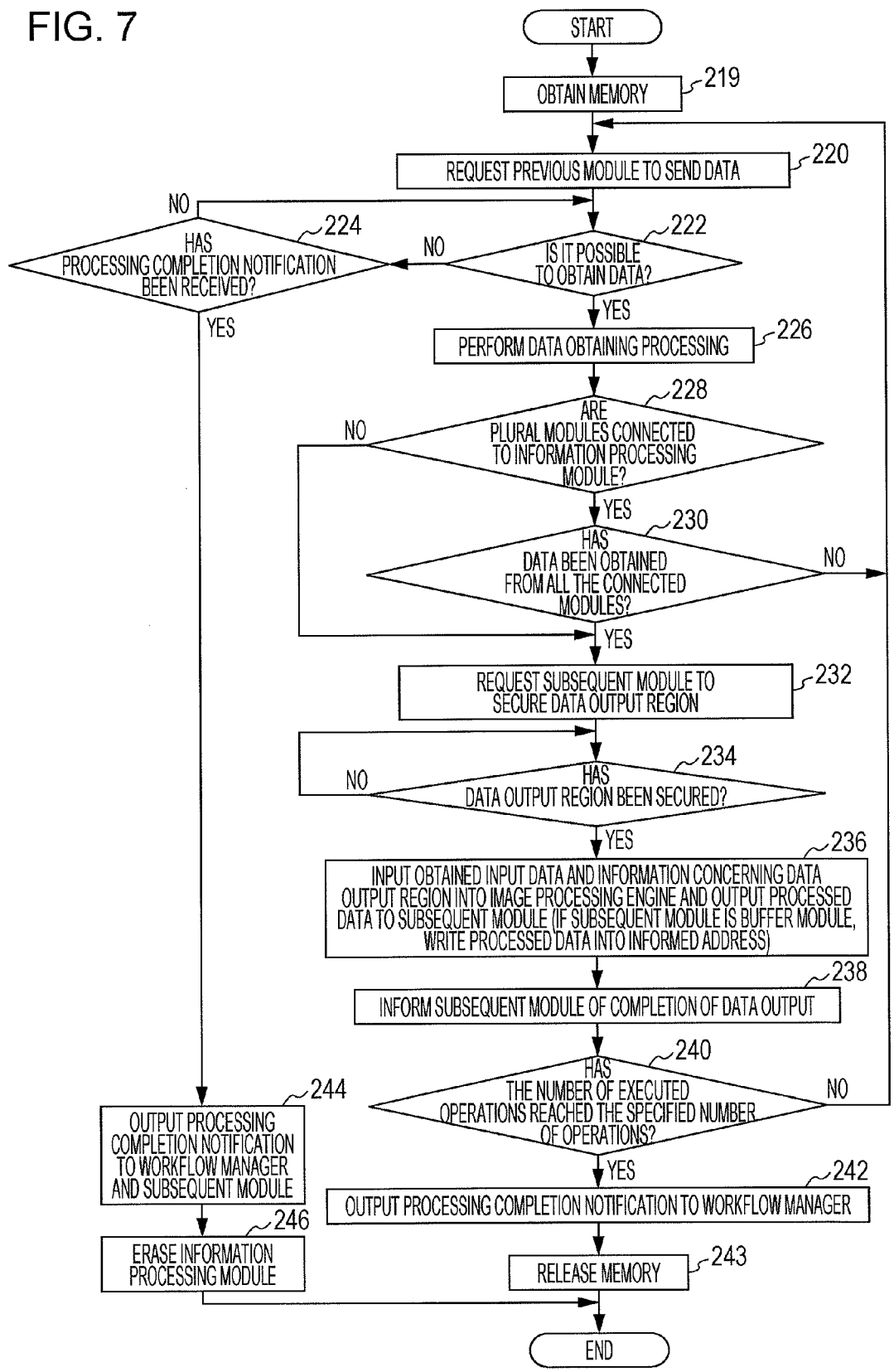
FIG. 7 is a flowchart illustrating image-processing-module control processing performed by a controller of each image processing module.

A description will now be given, with reference to FIG. 7, of image-processing-module control processing that is performed by the controller 38B of each of the image processing modules 38 forming the image processor 50 every time a processing request is input from the workflow manager 46A into the image processing module 38. The configuration of the parallel image processor 50 is the same as that of the serial image processor 50. Thus, the image-processing-module control processing will be described without considering whether the image processor 50 is the parallel image processor 50 or the serial image processor 50.

In the image-processing-module control processing, in step 219, on the basis of the type and the content of image processing to be performed by the image processing engine 38A, the controller 38B identifies the size of a memory used by the image processing module 38 and the presence or the absence of other resources. The major part of the memory used by the image processing module 38 is a memory necessary for performing image processing by the image processing engine 38A. However, if the previous module is the image data supply unit 22 or if the subsequent module is the image output unit 24, a buffer memory may be necessary for temporarily storing image data when sending and receiving the image data to and from the previous module or the subsequent module. Also, if information concerning, for example, a table, is contained in processing parameters, a memory area for storing such information may be necessary. Then, the controller 38B requests the resource manager 46B to secure a memory area having the identified size, and obtains the secured memory area from the resource manager 46B. If the image processing engine 38A of the image processing module 38 needs a resource other than the memory, the controller 38B requests the resource manager 46B to secure the required resource and obtains the required resource from the resource manager 46B.

In step 220, if a module (buffer module 40, image data supply unit 22, or image processing module 38) is positioned prior to the image processing module 38, the controller 38B requests such a module to send data (image data or an image processing result, such as analyzed data). Then, in step 222, the controller 38B determines whether it is possible to obtain data from the previous module. If the result of step 222 is NO, the controller 38B determines in step 224 whether a processing completion notification has been received. If the result of step 224 is NO, the controller 38B returns to step 222 to repeat steps 222 and 224 until it is determined in step 222 that it is possible to obtain data from the previous module. If the result of step 222 is YES, the controller 38B proceeds to step 226 to perform data obtaining processing. More specifically, the controller 38B obtains data from the previous module, and writes the obtained data into a temporary storage memory area of the memory obtained in step 219.

It is now assumed that the previous module is the buffer memory 40. In this case, the controller 38B requests the previous module to send data in step 220, and if valid data stored in the buffer 40A of the buffer module 40 is equal to or greater than the unit read data amount, or if the end of the valid data coincides with the end of image data to be processed, the buffer module 40 immediately informs the image processing module 38 of the head address of the read area so as to request the image processing module 38 to read the image data. Even if neither of the above-described two conditions is satisfied, the image processing module 38 positioned prior to the buffer module 40 writes image data into the buffer 40A of the buffer module 40, and then, one of the two conditions is satisfied. Then, the buffer module 40 immediately informs the image processing module 38 of the head address of the read area so as to request the image processing module 38 to read the image data. After this processing, the result of step 222 has become YES, and the controller 38B proceeds to step 226. In step 226, the controller 38B performs data obtaining processing. More specifically, the controller 38B reads the unit read data amount of image data (or a data amount smaller than the unit read data amount) from the head address of the read area, and writes the image data into a temporary storage memory area (see also (3) of FIG. 4A).

It is now assumed that the previous module of the image processing module 38 is the image data supply unit 22. In this case, the controller 38B requests the previous module to send data in step 220, and then, in step 222, the image data supply unit 22 immediately informs the image processing module 38 that it is possible to obtain data. Accordingly, the result of step 222 is YES, and the controller 38B proceeds to step 226 to perform data obtaining processing. More specifically, the controller 38B obtains the unit read data amount of image data from the image data supply unit 22 and writes the image data into a temporary storage memory area. It is now assumed that the previous module of the image processing module 38 is the image processing module 38. In this case, the controller 38B requests the previous module to send data in step 220, and then, in step 222, if the previous image processing module 38 is ready to execute image processing, a write request is input. Thus, the previous image processing module 38 informs that it is possible to obtain data. Accordingly, the result of step 222 is YES, and the controller 38B proceeds to step 226 to perform data obtaining processing. More specifically, the controller 38B informs the previous image processing module 38 of the address of the temporary storage memory area and causes the previous image processing module 38 to write data into the temporary storage memory area.

In step 228, the controller 38B determines whether plural modules are connected subsequent to the image processing module 38. If the result of step 228 is NO, the controller 38B proceeds to step 232. If the result of step 228 is YES, the controller 38B proceeds to step 230 to determine whether data has been obtained from all the modules connected to the image processing module 38. If the result of step 230 is NO, the controller 38B returns to step 220 and repeats steps 220 through 230 until the result of step 230 becomes YES. If it is determined in step 230 that data has been obtained from all the modules, the result of step 230 becomes YES, and the controller 38B proceeds to step 232.

In step 232, the controller 38B requests the subsequent module to secure a data output region. Then, the controller 38B determines in step 234 whether a data output region has been secured. If the result of step 234 is NO, this determination is repeated until a data output region has been obtained in step 232. If the subsequent module is a buffer module 40, the above-described request to secure a data output region can be made by outputting a write request to the buffer module 40. If it is determined in step 234 that a data output region has been secured (the head address of a write area if the subsequent module is a buffer module 40) (see also (4) of FIG. 4A), the controller 38B proceeds to step 236. In step 236, the controller 38B inputs data obtained in the data obtaining processing in step 226, information concerning the data output region secured from the subsequent module in step 234 (or the head address of the data output region), and information concerning the image-processing memory area used by the image processing engine 38A of the memory obtained in step 219 (the head address and the size of the memory area) into the image processing engine 38A, and causes the image processing engine 38A to perform predetermined image processing on the input data by using the image processing memory area (see (5) of FIG. 4A). The controller 38B also causes the image processing engine 38A to input the processed data into the data output region (see (6) of FIG. 4A). After the completion of the input of the unit read data amount of image data into the image processing engine 38A and after writing the entire data output from the image processing engine 38A into the data output region, the controller 38B proceeds to step 238 so as to inform the subsequent module that the output of data has been completed.

After steps 220 through 238, processing for the image data for the unit-processing data amount (unit processing) performed by the image processing module 238 has been completed. By means of a processing request input from the workflow manager 46A into the image processing module 38, the workflow manager 46A may specify the number of unit processing operations to be executed. Accordingly, in step 240, the controller 38B determines whether the number of executed unit processing operations has reached the specified number of unit processing operations. If the specified number of unit processing operations is one, the result of this determination is unconditionally YES. If the number of unit processing operations is two or more, the process returns to step 220, and the controller 38B repeats steps 220 through 240 until the result of step 240 becomes YES. If the result of step 240 is YES, the controller 38B proceeds to step 242 to output a processing completion notification to the workflow manager 46A in order to inform the workflow manager 46A that processing for the input processing request has been completed. Then, in step 243, the controller 38B releases the memory. Then, the controller 38B completes the image-processing-module control processing.

The above-described processing is repeated every time a processing request is input from the workflow manager 46A. As a result, when the entire image data has been processed until the end, the previous module informs the image processing module 38 that the processing for the entire image data has been completed. Then, the result of step 224 is YES, and the controller 38B proceeds to step 244. In step 244, the controller 38B outputs a processing completion notification indicating that image data has been processed to the workflow manager 46A and the subsequent module. It is noted that, in most cases, image data to be processed represents one page of an image, but may represent plural pages of images. In step 246, the controller 38B requests the resource manager 46B to release all the obtained resources so as to erase the image processing module 38. Then, the image-processing-module control processing has been completed.

Figure 8A:
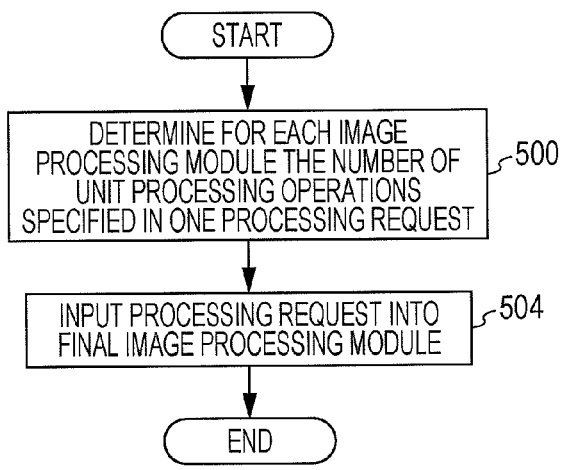
FIGS. 8A through 8D are flowcharts illustrating parallel control processing performed by a workflow manager of a parallel processing manager.

If the processing manager 46 in operation is the parallel processing manager 46-1, the workflow manager 46A performs parallel control processing 1 shown in FIG. 8A in response to an instruction to execute image processing. As described above, in a processing request input from the workflow manager 46A into each of the image processing modules 38 of the image processor 50, the workflow manager 46A may specify the number of unit processing operations to be executed. In parallel control processing 1, in step 500, the workflow manager 46A determines for each image processing module 38 the number of unit processing operations which is specified in one processing request. The number of unit processing operations specified in one processing request may be determined so that the numbers of times for which processing requests are input into the image processing modules 38 while the entire image data is being processed are averaged. Alternatively, the number of unit processing operations may be determined in accordance with another standard. Then, in step 504, the workflow manager 46A inputs a processing request into the final image processing module 38 of the image processor 50 (see also (1) of FIG. 9). The workflow manager 46A then completes the parallel control processing 1.

Figure 9:
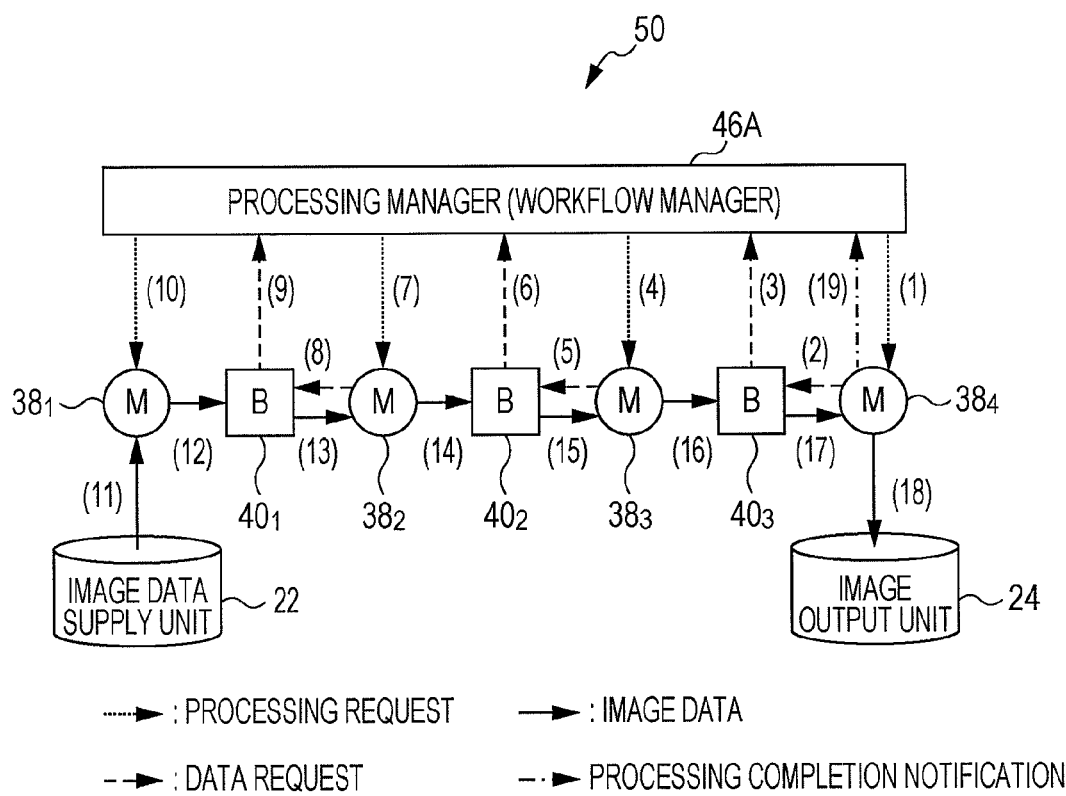
FIG. 9 is a schematic diagram illustrating the flow of image processing in an image processor.

In the image processor 50 shown in FIG. 9, when a processing request is input from the workflow manager 46A to the final image processing module $38_4$, the controller 38B of the image processing module $38_4$ outputs a read request to the previous buffer module $40_3$ (see (2) of FIG. 9). In this case, since valid data (image data) that can be read by the image processing module $38_4$ is not stored in the buffer 40A of the buffer module $40_3$, the buffer controller 40B of the buffer module $40_3$ inputs a data request into the workflow manager 46A (see (3) of FIG. 9).

Figure 8B:
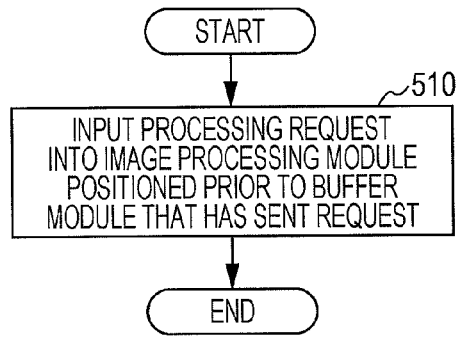

Every time a data request is received from the buffer module 40, the workflow manager 46A of the parallel processing manager 46-1 performs parallel control processing 2 shown in FIG. 8B. In the parallel control processing 2, in step 510, the workflow manager 46A identifies the image processing module 38 (in this case, the image processing module $38_3$) positioned prior to the buffer module 40 that has sent the data request (in this case, the buffer module $40_3$). Then, the workflow manager 46A inputs a processing request to the identified image processing module 38 (see also (4) of FIG. 9). The workflow manager 46A then completes the parallel control processing 2.

Upon receiving the processing request from the workflow manager 46A, the controller 38B of the image processing module $38_3$ inputs a read request into the previous buffer module $40_2$ (see (5) of FIG. 9). Since image data that can be read by the image processing module $38_3$ is not stored in the buffer 40A of the buffer module $40_2$, the buffer controller 40B of the buffer module $40_2$ inputs a data request into the workflow manager 46A (see (6) of FIG. 9). In response to the data request from the buffer module $40_2$, the workflow manager 46A performs again the above-described parallel control processing 2 so as to input a processing request to the previous image processing module $38_2$ (see (7) of FIG. 9). The controller 38B of the image processing module $38_2$ inputs a read request into the previous buffer module $40_1$ (see (8) of FIG. 9). Since image data that can be read by the image processing module 38 is not stored in the buffer 40A of the buffer module $40_1$, the buffer controller 40B of the buffer module $40_1$ also inputs a data request into the workflow manager 46A (see (9) of FIG. 9). In response to the data request from the buffer module $40_1$, the workflow manager 46A performs again the above-described parallel control processing 2 so as to input a processing request to the image processing module $38_1$ (see (10) of FIG. 9).

The module positioned prior to the image processing module $38_1$ is the image data supply unit 22. Accordingly, the controller 38B of the image processing module $38_1$ inputs a data request into the image data supply unit 22 so as to obtain image data for the unit read data amount from the image data supply unit 22 (see (11) of FIG. 9). Then, the image processing engine 38A of the image processing module $38_1$ performs image processing on the obtained image data. The image processing module $38_1$ writes the processed image data into the buffer 40A of the subsequent buffer module $40_1$ (see (12) of FIG. 9).

When valid data which is equal to or greater than the unit read data amount and which can be read by the subsequent image processing module $38_2$ is written into the buffer module $40_1$, the buffer controller 40B of the buffer module $40_1$ requests the image processing module $38_2$ to read the image data. Then, the controller 38B of the image processing module $38_2$ reads the image data for the unit read data amount from the buffer 40A of the buffer module $40_1$ (see (13) of FIG. 9). The image processing engine 38A of the image processing module $38_2$ processes the image data, and then, the controller 38B of the image processing module $38_2$ writes the processed image data into the buffer 40A of the subsequent buffer module $40_2$ (see (14) of FIG. 9). When valid data which is equal to or greater than the unit read data amount and which can be read by the subsequent image processing module $38_3$ is written into the buffer module $40_2$, the buffer controller 40B of the buffer module $40_2$ requests the image processing module $38_3$ to read the image data. Then, the controller 38B of the image processing module $38_3$ reads the image data for the unit read data amount from the buffer 40A of the buffer module $40_2$ (see (15) of FIG. 9). The image processing engine 38A of the image processing module $38_3$ then processes the image data, and then, the controller 38B of the image processing module $38_3$ writes the processed image data into the buffer 40A of the subsequent buffer module $40_3$ (see (16) of FIG. 9).

Further, when valid data which is equal to or greater than the unit read data amount and which can be read by the subsequent image processing module $38_4$ is written into the buffer module $40_3$, the buffer controller 40B of the buffer module $40_3$ requests the image processing module $38_4$ to read the image data. Then, the controller 38B of the image processing module $38_4$ reads the image data for the unit read data amount from the buffer 40A of the buffer module $40_3$ (see (17) of FIG. 9). The image processing engine 38A of the image processing module $38_4$ then processes the image data, and then, the controller 38B of the image processing module $38_4$ writes the processed image data into the image output unit 24, which is the subsequent module (see (18) of FIG. 9).

Figure 8C:
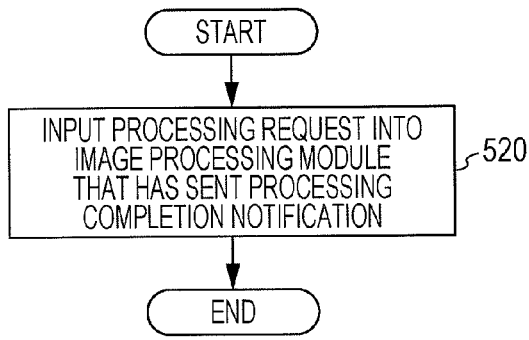

Upon completion of writing of image data into the buffer 40A of the subsequent buffer module 40, the controller 38B of each of the image processing modules 38 sends a processing completion notification to the workflow manager 46A. Upon receiving a processing completion notification from each image processing module 38, the workflow manager 46A of the parallel processing manager 46-1 performs parallel control processing 3 shown in FIG. 8C. In the parallel control processing 3, in step 520, the workflow manager 46A inputs again a processing request to the image processing module 38 that has sent the processing completion notification. The workflow manager 46A then completes parallel control processing 3.

In this manner, in the parallel control processing performed by the workflow manager 46A of the parallel processing manager 46-1, the following image processing in accordance with the parallel processing mode is implemented. More specifically, every time a processing completion notification is input from a certain image processing module 38, the workflow manager 46A inputs again a processing request into the image processing module that has sent the processing completion notification. Thus, subject image data is sequentially delivered from a previous module to a subsequent module in units of blocks having a size smaller than one frame of an image, and also, the individual image processing modules 38 perform processing on the image data in parallel. When the image data supplied from the image data supply unit 22 reaches the end of the subject image data, the individual image processing modules 38 input an entire-processing completion notification to the workflow manager 46A in the order from the first image processing module 38 (upstream side) to the final image processing module 38 (downstream side).

Figure 8D:
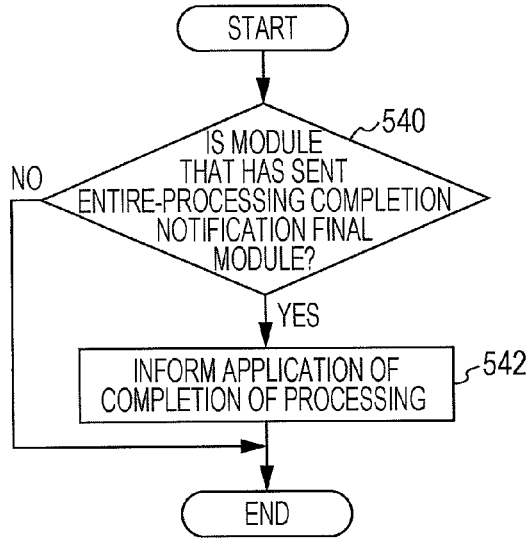

Every time an entire-processing completion notification is input from the image processing module 38, the workflow manager 46A of the parallel processing manager 46-1 performs parallel control processing 4 shown in FIG. 8D. In the parallel control processing 4, in step 540, the workflow manager 46A determines whether the image processing module 38 that has sent the entire-processing completion notification is the final image processing module 38. If the result of step 540 is NO, the processing is completed. However, if the entire-processing completion notification has been input from the final image processing module 38 since the entirety of the image data subjected to the required image processing has been output to the image output unit 24, the result of step 540 becomes YES. Then, the workflow manager 46A proceeds to step 542 to inform the application program 32 of the completion of the image processing (see also step 178 of FIG. 11). Then, the workflow manager 64A completes the parallel control processing 4. Upon receiving an image-processing completion notification from the workflow manager 164A, the application program 32 informs the user of the completion of the image processing (see step 180 of FIG. 11).

Figure 10C:
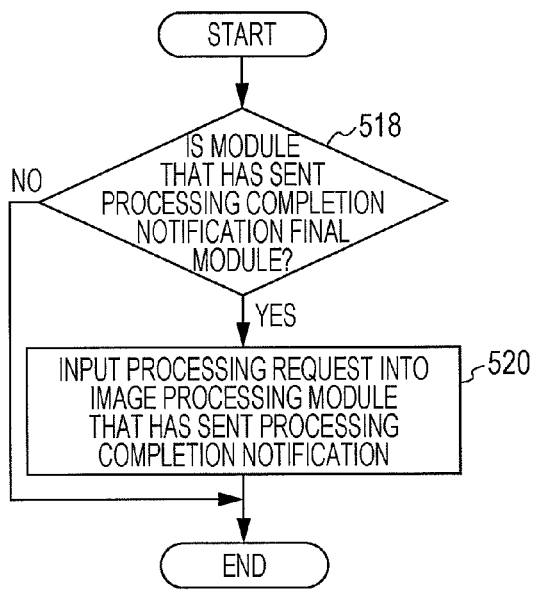
Figure 10D:
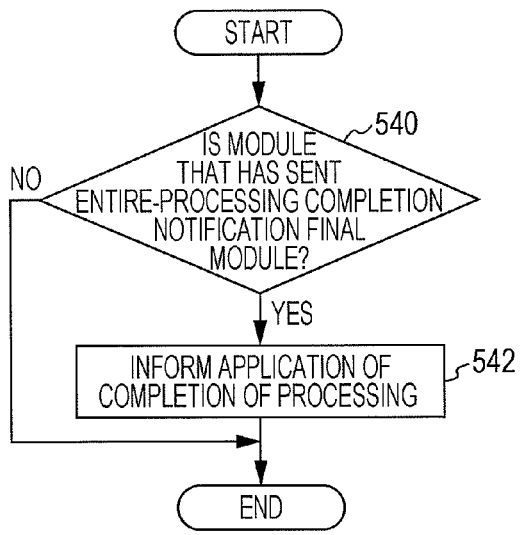

If the processing manager 46 in operation is a serial processing manager 46-2, the workflow manager 46A performs the following processing. In response to an instruction to execute image processing, the workflow manager 46A of the serial processing manager 46-2 performs block-unit serial control processing 1 shown in FIG. 10A. Every time a data request is input from the buffer module 40, the workflow manager 46A performs block-unit serial control processing 2 shown in FIG. 10B. Every time a processing completion notification is input from the image processing module 38, the workflow manager 46A performs block-unit serial control processing 3 shown in FIG. 10C. Every time an entire-processing completion notification is input from the image processing module 38, the workflow manager 46A performs block-unit serial control processing 4 shown in FIG. 10D. The processes of the block-unit serial control processing 1, 2, and 4 are the same as those of the above-described parallel control processing 1, 2, and 4, respectively, and an explanation thereof is thus omitted. A description will be given of the block-unit serial control processing 3 performed every time a processing completion notification is input from the image processing module 38.

In the block-unit serial control processing 3, in step 518, the workflow manager 46A determines whether the image processing module 38 that has sent the processing completion notification is the final image processing module 38. If the result of step 518 is NO, the processing is completed. If the result of step 518 is YES, the workflow manager 46A proceeds to step 520 to input again a processing request to the image processing module 38 that has sent the processing completion notification.

In the block-unit serial control processing performed by the workflow manager 46A of the serial processing manager 46-2, the following image processing in accordance with the serial processing mode is implemented. A processing request input into the final image processing module 38 of the image processor 50 is sequentially transferred, and when the processing request reaches the first image processing module 38, serial image processing is sequentially performed on data having a size (block) smaller than one frame of an image in the order from the first image processing module 38 to the final image processing module 38. In this case, only one image processing module 38 performs image processing at one time, and also, the image processing modules 38 are serially switched to perform image processing. When image processing for the above-described data performed by the final image processing module 38 has finished, a processing request is input again into the final image processing module 38. This processing is repeated.

While the workflow manager 46A is performing control so that the image processor 50 executes image processing in accordance with the parallel processing mode or the serial processing mode, the error handler 46C of the processing manager 46 is also operated. If an error has occurred in a certain image processing module 38 of the image processor 50, an error occurrence notification is input from the image processing module 38 in which an error has occurred into the error handler 46C. Upon receiving the error occurrence notification, the error handler 46C obtains error information concerning the type of error, etc., and also obtains, from the storage unit 20, etc., device environment information concerning the type and configuration of a device into which the computer 10 having the image processing program set 34 is integrated. The error handler 46C then determines a manner of notifying the device of the occurrence of an error which is suitable for the device environments represented by the obtained device environment information, and then notifies the device of the occurrence of the error in accordance with the determined manner.

In this case, if the image processor 50 performs serial image processing in accordance with the serial processing mode, only one image processing module 38 performs image processing. Accordingly, it is not possible that an error occurrence notification be simultaneously or substantially simultaneously input from plural image processing modules 38 into the error handler 46C. Additionally, the programs of the individual modules forming the image processor 50 are operated as a single thread, and thus, if image processing is terminated in one of the image processing modules 38 because of the occurrence of a crucial error, the entire image processing which is being performed in the image processor 50 is also terminated. In contrast, if the image processor 50 performs parallel image processing in accordance with the parallel processing mode, the individual image processing modules 38 perform image processing in parallel. Accordingly, it is possible that an error occurrence notification be simultaneously or substantially simultaneously input from plural image processing modules 38 into the error handler 46C. Additionally, the programs of the individual modules forming the image processor 50 are operated as independent threads, and thus, even if image processing is terminated in one of the image processing modules 38 because of the occurrence of a crucial error, the image processing continues in the other image processing modules 38 of the image processor 50.

Thus, in order to avoid inconveniences which may be caused when an error occurrence notification is simultaneously or substantially simultaneously input from plural image processing modules 38 into the error handler 46C of the parallel processing manager 46-1, the error handler 46C performs exclusive control. Also, if image processing is discontinued in one of the image processing modules 38 because of the occurrence of a crucial error in that image processing modules 38, the error handler 46C notifies the other image processing modules 38 of the occurrence of the error and causes the other image processing modules 38 to discontinue the image processing, and also terminates the execution of all the threads corresponding to the individual modules of the image processor 50. Accordingly, even when the image processor 50 performs image processing in accordance with the parallel processing mode, error handling can be carried out smoothly.

In this manner, the parallel processing manager 46-1 is provided with the error handler 46C which performs error handling suitable for the parallel processing mode. The serial processing manager 46-2 is provided with the error handler 46C which performs error handling suitable for the serial processing mode. The selection starter 45 selectively switches between the parallel processing manager 46-1 and the serial processing manager 46-2, and the two types of error handlers 46C are also automatically switched accordingly. With this arrangement, processing necessary for switching the image processor 50 between the parallel processing mode and the serial processing mode can be simplified.

Figure 15A:
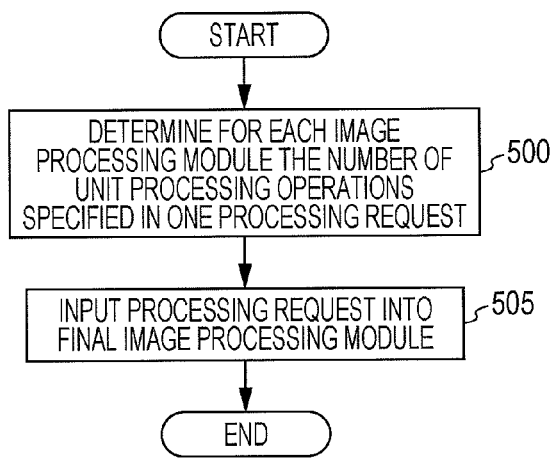
FIGS. 15A through 15C are flowcharts illustrating frame-unit serial control processing executed by a workflow manager of a serial processing manager.
Figure 15B:
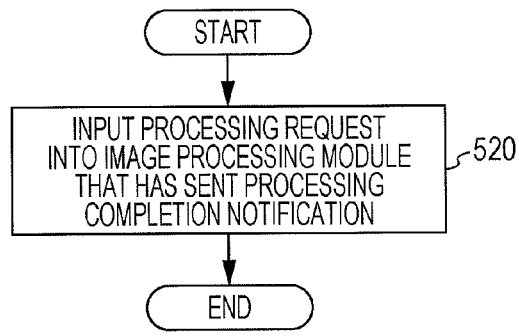

The processing performed by the workflow manager 46A when the image processor 50 is operated in accordance with the serial processing mode is not restricted to the processes of the block-unit serial control processing 1 through 4 shown in FIGS. 10A through 10D, respectively. Alternatively, processes of frame-unit serial control processing 1, 3, and 4 shown in FIGS. 15A through 15C, respectively, may be executed. In the frame-unit serial control processing 1 shown in FIG. 15A, in response to an instruction to execute image processing, in step 500, the workflow manager 46A determines for each image processing module 38 the number of unit processing operations which is specified in one processing request. Then, in step 505, the workflow manager 46A inputs a processing request into the first image processing module of the image processor 50. Also, every time a processing completion notification is input from the image processing module 38, the frame-unit serial control processing 3 shown in FIG. 15B is started. In step 520, the workflow manager 46A inputs again a processing request to the image processing module 38 that has sent the processing completion notification. With this operation, a processing request is repeatedly input only into the first image processing module 38 (upstream side) of the image processor 50.

Figure 15C:
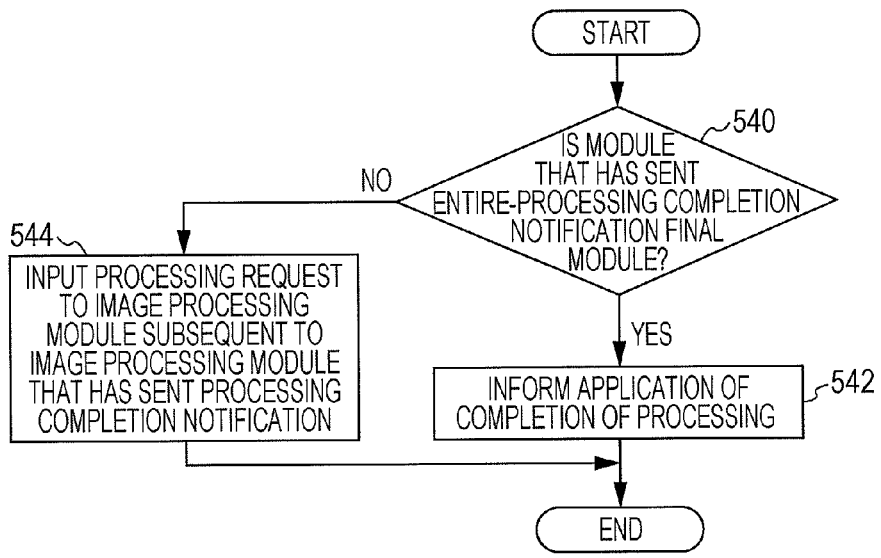

Every time an entire-processing completion notification is input from the image processing module 38, the frame-unit serial control processing 4 shown in FIG. 15C is started. In step 540, the workflow manager 46A determines whether the image processing module 38 that has sent the entire-processing completion notification is the final image processing module 38. If the result of step 540 is NO, the process proceeds to step 544. In step 544, a processing request is input into the image processing module 38 which is positioned subsequent to the image processing module 38 that has sent the entire-processing completion notification in the image processor 50 configured in the form of a pipeline or a DAG. With this operation, the image processing module 38 in operation discontinues image processing on subject image data and sends an entire-processing completion notification. Thereafter, the image processing module 38 that performs image processing is switched to the subsequent image processing module 38. In this manner, image processing is serially performed on data representing one frame of an image in the order from the first image processing module to the final image processing module in accordance with the serial processing mode. Then, an entire-processing completion notification is input from the final image processing module 38. In this case, the result of step 540 is YES, and the process proceeds to step 542 to inform the application program 32 of the completion of the image processing.

Figure 16:
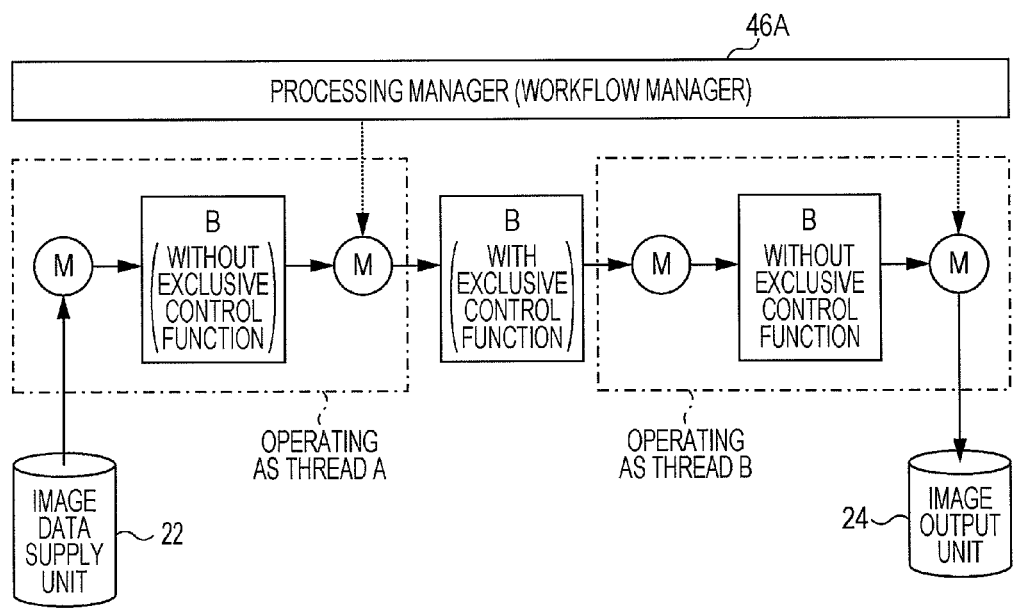
FIG. 16 is a block diagram illustrating another example of the configuration of an image processor.

In the above-described example, when the image processor 50 is operated in the parallel processing mode, the programs of the modules forming the image processor 50 are executed as independent threads. However, this is an example only, and programs of some of the modules forming the image processor 50 may be executed as a thread. FIG. 16 shows such an example. The image processor 50 is configured such that four image processing modules 38 and buffer modules 40 which intervene between the image processing modules 38 are connected (i.e., the image processing modules 38 and the buffer modules 40 are alternately connected) in the form of a pipeline. In this configuration, the first and second image processing modules 38 and the buffer module 40 intervening therebetween are executed as thread A, while the third and fourth image processing modules 38 and the buffer module 40 intervening therebetween are executed as thread B. Thread A and thread B are executed in parallel. In this case, an exclusive control function is not provided for the buffer module 40A disposed between the first and second image processing modules 38 that are operated in the serial processing mode or for the buffer module 40A disposed between the third and fourth image processing modules 38 that are operated in the serial processing mode. An exclusive control function is provided for the buffer module 40A disposed between the second and third image processing modules 38 that are operated in the parallel processing mode.

In the above-described example, a program of only one parallel processing manager 46-1 and a program of only one serial processing manager 46-2 are registered in the processing manager library 47. However, this is an example only. Plural parallel processing managers may be provided, and in accordance with the operating environments, etc., of the image processor 50, a parallel processing manager may be selected from the plural parallel processing managers. Similarly, plural serial processing managers may be provided, and in accordance with the operating environments, a serial processing manager may be selected from the plural serial processing managers. For example, if the number of program execution resources (e.g., CPU 12) is one, a serial processing manager may be selected so that the image processor 50 can perform image processing in the serial processing mode. If the number of program execution resources is two or more and is less than the number of image processing modules 38 forming the image processor 50, a parallel processing manager may be selected so that the image processor 50 can perform image processing in the parallel processing mode shown in FIG. 16 (the number of threads is restricted). If the number of program execution resources is two or more and is more than the number of image processing modules 38 forming the image processor 50, a parallel processing manager may be selected so that the image processor 50 can perform image processing in the parallel processing mode in which the programs of individual modules forming the image processor 50 are executed as independent threads.

There is a high possibility that the parallel processing mode in which the programs of individual modules forming the image processor 50 are executed as independent threads more effectively function as the number of program execution resources approaches the number of image processing modules. Thus, if the ratio of the number of program execution resources to the number of image processing modules is equal to or greater than a threshold (e.g., 0.8), the parallel processing manager that performs image processing in the above-described parallel processing mode may be selected.

Figure 2:
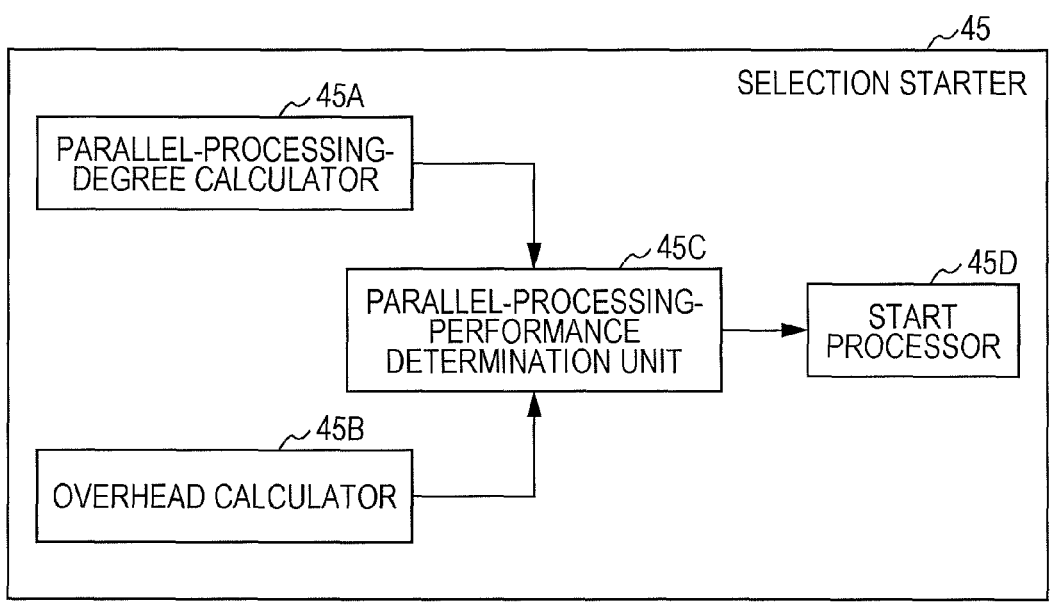
FIG. 2 is a block diagram illustrating an example of the functional configuration of a selection starter.
Figure 17:
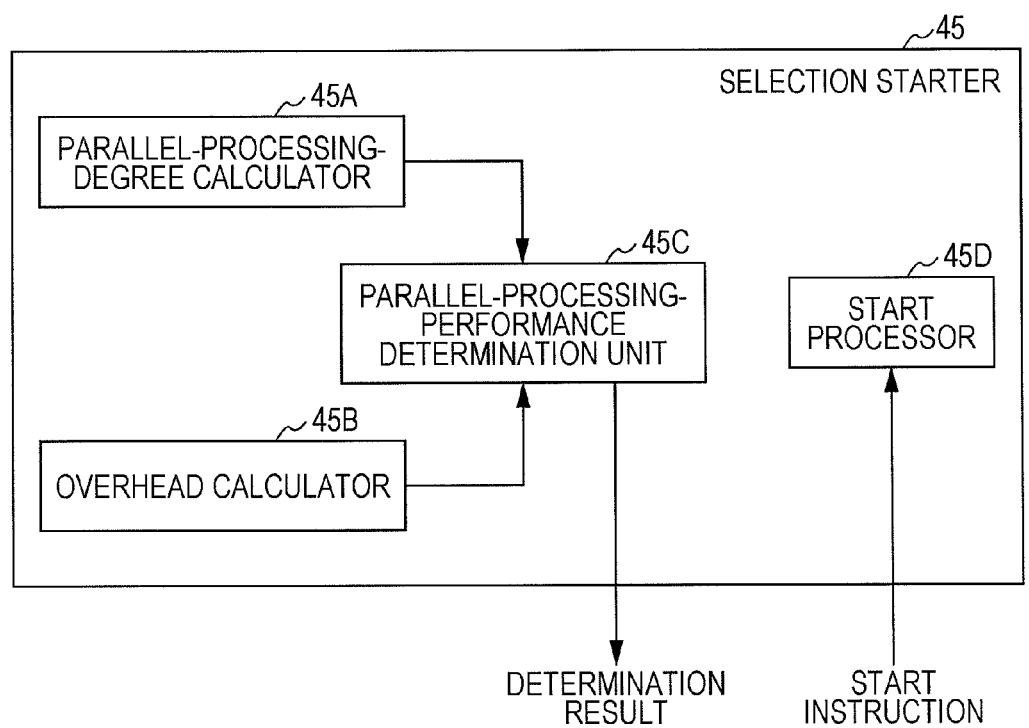
FIG. 17 is a block diagram illustrating another example of the configuration of a selection starter.

The functional configuration of the selection starter 45 is not restricted to that shown in FIG. 2, and may be that shown in FIG. 17. In FIG. 17, the same elements as shown in FIG. 2 are designated by like reference numerals. However, a determination result output from the parallel-processing-performance determination unit 45C is not output to the start processor 45D, but is output to an application program 32 or the OS 30 that performs display control so that the determination result is displayed on the display unit 16 or an external display device. Also, the start processor 45D is configured as follows. In response to an instruction to start a parallel processing manager or a serial processing manager given from a user via the operation unit 18, the start processor 45D selects the processing manager in accordance with the instruction.

Figure 18:
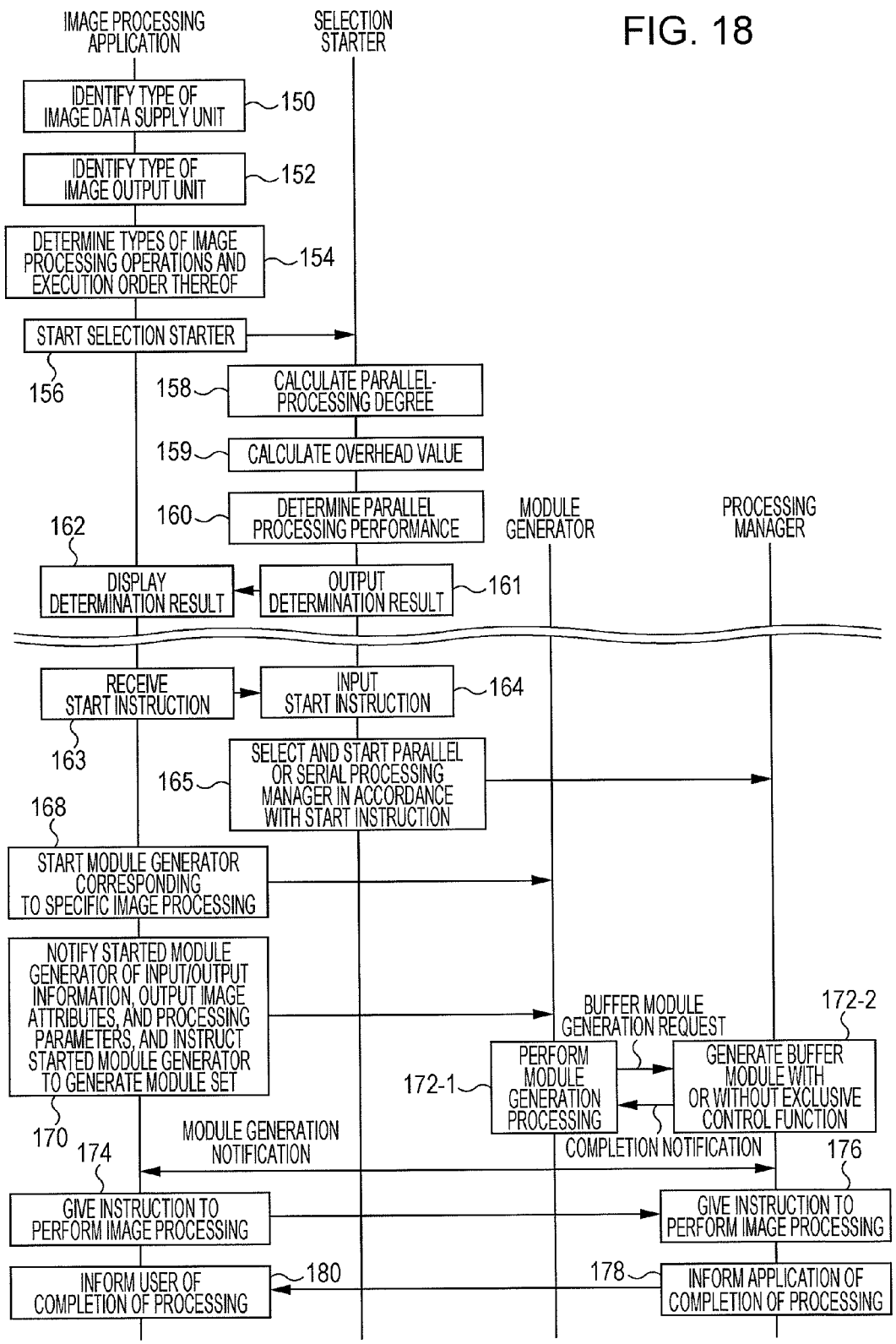
FIG. 18 is a sequence diagram illustrating another example of a series of processing operations from when an image processor is constructed until when image processing is executed.

FIG. 18 is a sequence diagram when the processing manager 46 is started by the start processor 45D shown in FIG. 17. In FIG. 18, the same operations as shown in FIG. 11 are designated by like step numbers, and an explanation thereof is thus omitted. Steps 150 through 160 are operated in a manner similar to those discussed with reference to FIG. 11. After the parallel-processing-performance determination unit 45C determines the parallel processing performance in step 160, the process proceeds to step 161. In step 161, the parallel-processing-performance determination unit 45C outputs a determination result to the application program 32 (or the OS 30) that performs display control for displaying the determination result. Then, in step 162, upon receiving the determination result, the application program 32 or the OS 30 displays the determination result on the display unit 16, etc., and then waits for a start instruction to be input from a user. In step 163, upon receiving a start instruction from a user through the operation unit 18, the application program 32 or the OS 30 receives the start instruction. In step 164, the application program 32 or the OS 30 inputs the start instruction to the start processor 45D of the selection starter 45. Then, in step 165, the start processor 45D selects and starts the parallel processing manager or the serial processing manager in accordance with the input start instruction.

An exemplary embodiment of the invention may be applied to a device without the start processor 45D. More specifically, a device including the parallel-processing-degree calculator 45A, the overhead calculator 45B, and the parallel-processing-performance determination unit 45C may be provided independently of an apparatus that constructs a data processor (image processor 50). Such a device may determine the parallel processing performance and output a determination result to an external source.

In the above-described exemplary embodiment, the processing load and the processing wait coefficient (processing wait degrees) are used as the parameters for calculating the parallel-processing degree. However, the parameters are not restricted to the processing load and the processing wait coefficient. For example, a variation in the processing loads may be used as a parameter. For example, the parallel-processing degree may be calculated to decrease as the variation increases. Alternatively, one of the processing load and the processing wait coefficient may be used. Further, in the above-described example, the processing load is calculated to increase as the number of multiplications and additions contained in the processing performed in the image processing modules 38 increases. Instead of the number of multiplications and additions, the processing load may be calculated to increase as the number of specific operations contained in processing increases. Also, the time necessary for each image processing module 38 to perform the unit processing may be measured in advance, and a table including information concerning this time may be stored in the storage unit 20 in advance. Then, the parallel-processing degree may be calculated by referring to this table. Also, information concerning the number of lines of a program code for each image processing module 38 may be stored in the storage unit 20 (or may be counted every time the parallel-processing degree is calculated), and the processing load may be calculated to increase as the number of lines increases.

In the above-described exemplary embodiment, the processing wait degree of each image processing module 38 is calculated on the basis of the unit-processing data amount. However, this is an example only. Alternatively, information indicating whether image processing performed by the image processing module 38 is page processing or line processing may be stored in the storage unit 20. The page processing is used for processing data representing one frame of an image. The line processing is used for processing data representing one line of an image, which is smaller than one page of an image. Also, the processing wait degree may be set in advance in accordance with whether image processing is to be performed on the basis of page processing or line processing, and the processing wait coefficient may be calculated by use of such processing wait degrees.

In the above-described exemplary embodiment, the overhead value is determined in accordance with the connection mode or the number of image processing modules 38. However, parameters for calculating the overhead value are not restricted to such factors. For example, the overhead value may be calculated in accordance with the ratio of the occurrence of locks in threads. More specifically, in exclusive control, when data is written into the buffer 40A of the buffer module 40, a lock is set in order to prevent plural modules from simultaneously accessing the buffer 40A. In this case, every time data is written into the buffer 40A, a lock is set, and as the time for which a lock is set increases, the overhead necessary for parallel processing increases. Thus, the ratio of the time for which a lock is set to the time taken by the entire writing processing may be measured in advance for each image processing module 38, and as this ratio increases, the overhead value may be calculated to increase. Alternatively, the overhead value may be calculated on the basis of at least one of the number of processing operations, the connection mode, and the ratio of the time for which a lock is set in threads. Concerning the connection mode, in the above-described exemplary embodiment, the coefficient is different depending on whether the connection mode is parallel connection or serial connection. When the connection mode is parallel connection, the coefficient may be varied in accordance with the number of image processing modules 38 connected in parallel.

In the above-described exemplary embodiment, in order to determine the parallel processing performance, the values of the parallel-processing degree and the overhead value are compared to simply determine which is greater or smaller. However, the parallel processing performance may be determined differently. For example, if the value obtained by subtracting the overhead value from the parallel-processing degree is greater than a predetermined threshold, it may be determined that the time necessary to complete the parallel processing would be shorter than the time necessary to complete the serial processing. If the above-described value is equal to or smaller than the predetermined threshold, it may be determined that the time necessary to complete the parallel processing would be longer than the time necessary to complete the serial processing. Alternatively, the parallel processing performance may be determined on the basis of a result of comparing the parallel-processing degree with a first threshold and a result of comparing the overhead value with a second threshold. More specifically, if the parallel-processing degree is greater than the first threshold and if the overhead value is smaller than the second threshold, it may be determined that the time necessary to complete the parallel processing would be shorter than the time necessary to complete the serial processing. If the results are other than the above-described result, it may be determined that the time necessary to complete the parallel processing would be longer than the time necessary to complete the serial processing. Alternatively, if the parallel-processing degree is smaller than the first threshold and if the overhead value is greater than the second threshold, it may be determined that the time necessary to complete the parallel processing is the same as the time necessary to complete the serial processing.

In the above-described exemplary embodiment, the parameters used for calculating the parallel-processing degree are different from those for calculating the overhead value. Alternatively, both the parallel-processing degree and the overhead value may be determined by using the common parameters. As the unit-processing data amount is smaller, the parallel-processing degree increases. At the same time, however, the number of exclusive control operation also increases, and thus, the overhead value increases. Also, as the processing load increases, the parallel-processing degree increases and the overhead value decreases. In this manner, by use of parameters related to both the parallel-processing degree and the overhead value, the parallel-processing degree and the overhead value may be calculated.

Instead of separately calculating the parallel-processing degree and the overhead value, in order to determine the parallel processing performance, the value (or the parameter) representing both the parallel-processing degree and the overhead value may be compared with a predetermined threshold. The processing wait coefficient depends on the unit-processing data amount. As described above, as the unit-processing data amount decreases, the processing wait coefficient increases, and thus, the parallel-processing degree increases. At the same time, however, the overhead value also increases. That is, the processing wait coefficient (or the unit-processing data amount) may influence both the parallel-processing degree and the overhead value. Accordingly, if threshold A<the processing wait coefficient<threshold B (threshold A<threshold B), it may be determined that the time necessary to complete the parallel processing would be shorter than the time necessary to complete the serial processing. If the result is other than the above-described result, it may be determined that the time necessary to complete the parallel processing would be longer than the time necessary to complete the serial processing. Alternatively, in addition to the processing wait coefficient, the total of processing loads may also be considered, and if threshold a<the total of processing loads×the processing wait coefficient<threshold b (threshold a<threshold b), it may be determined that the time necessary to complete the parallel processing would be shorter than the time necessary to complete the serial processing. If the result is other than the above-described result, it may be determined that the time necessary to complete the parallel processing would be longer than the time necessary to complete the serial processing.

It is not necessary that the programs of the processing manager 46 be permanently stored in the processing manager library 47 of the storage unit 20. Alternatively, from an external source of the computer 10 via an external storage device, such as a universal serial bus (USB) memory, or a communication circuit, a program of a new processing manager (parallel processing manager or serial processing manager) may be received and added or the program of the registered processing manager may be updated. In accordance with the adoption of a new architecture for the CPU 12, the optimum form of parallel processing may be changed. It may also be difficult to initially provide a program that realizes an optimum processing manager, or a high-efficiency algorithm for a processing manager may be developed in the future. By considering such possibilities, it is desirable that the processing manager library 47 of the storage unit 20 be configured such that new programs can be added or the programs of the processing manager can be updated.

Alternatively, only a serial processing manager may be provided initially, and if a user desires faster image processing by causing the image processor 50 to perform parallel processing, the user may be allowed to add new programs that realizes a parallel processing manager by paying an additional fee. Alternatively, the user may be allowed to update the programs of the processing manager during a certain period on the basis of a maintenance contract.

In the above-described exemplary embodiment, the image processing program set 34 is stored in advance (installed) in the storage unit 20. However, the image processing program set 34 may be provided by being recorded on a compact disc-read only memory (CD-ROM) or a digital versatile disk (DVD)-ROM.

In the above-described exemplary embodiment, the computer 10 is configured as an image processing apparatus. However, a data processing apparatus that processes various types of data (e.g., arithmetic processing) other than image data may be applied to an exemplary embodiment of the invention.

Figure 19:
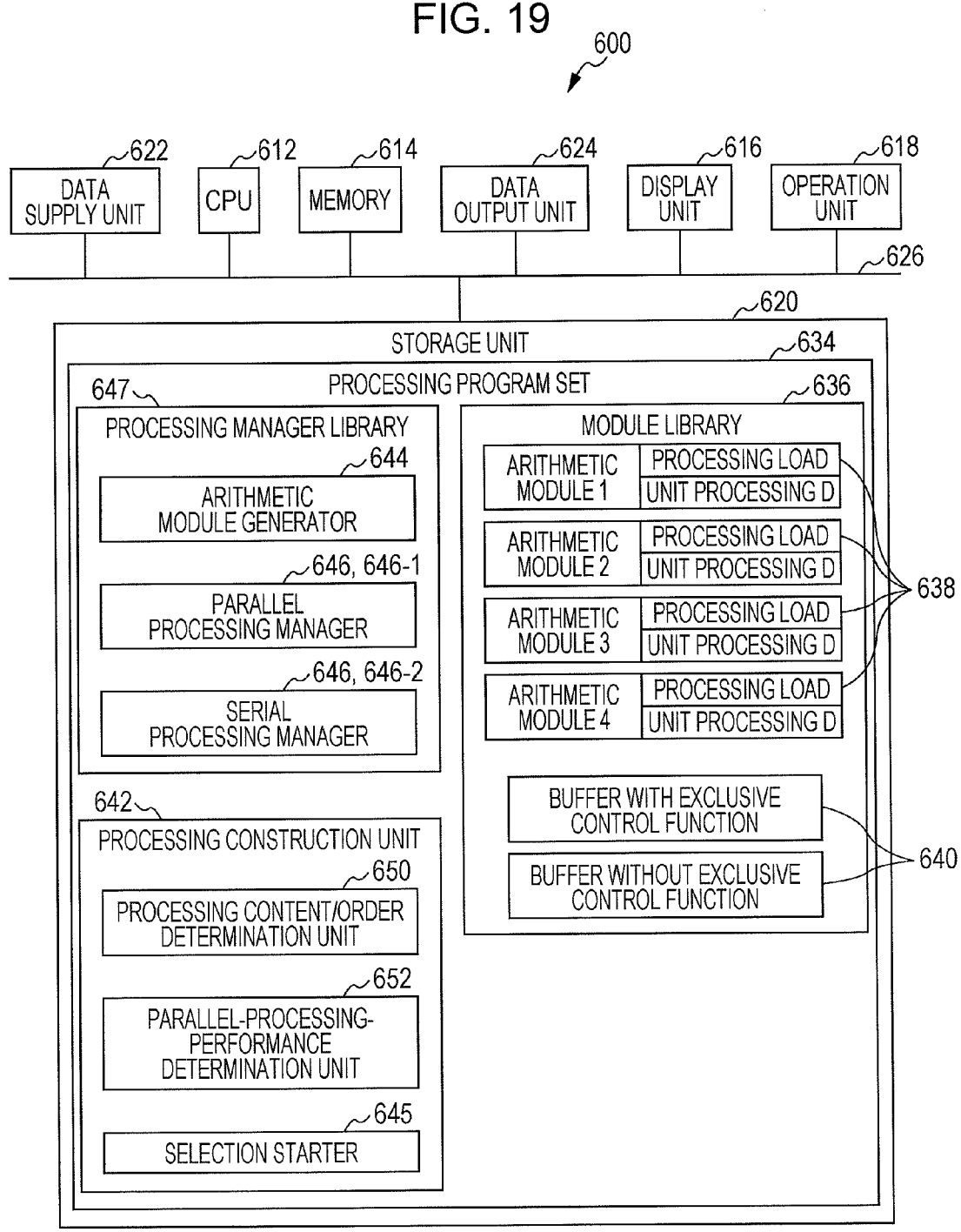
FIG. 19 is a block diagram illustrating the schematic configuration a computer (data processing apparatus) according to another exemplary embodiment of the invention.

FIG. 19 is a block diagram illustrating the schematic configuration of a computer 600, which serves as a data processing apparatus that performs arithmetic processing on data which is other than image data in accordance with another exemplary embodiment of the invention. The computer 600 includes a CPU 612, a memory 614, a display unit 616, an operation unit 618, a storage unit 620, a data supply unit 622, and a data output unit 624. Those components are connected to one another via a bus 626. As the display unit 616, a display connected to the computer 600 may be used, and as the operation unit 618, a keyboard and a mouse connected to the computer 600 may be used. As the storage unit 620, an HDD may be suitably used, or another non-volatile storage device, such as a flash memory, may be used.

As the data supply unit 622, any type of device may be used as long as it is configured to supply data to be processed. A receiver that receives data from an external source via an interface or a communication circuit used for connecting the computer 600 with an external memory may be used. Or, a data storage unit (memory 614 or storage unit 620) for storing data may be used. As the data output unit 624, any type of device may be used as long as it is configured to output data subjected to arithmetic processing. For example, a display unit for displaying data on a display, etc., a writer for writing data on a recording medium, or a sender for sending data via a communication circuit may be used. Alternatively, the data output unit 624 may be a storage device (memory 614 or storage unit 620) for simply storing data subjected to arithmetic processing.

In the storage unit 620, as shown in FIG. 19, programs of an OS and an image processing program set 634 are stored as various programs executed by the CPU 612. The programs of the OS are used for the management of the resources, such as the memory 614, and for the management of the execution of programs by the CPU 612. The programs of the OS are also used for controlling communication between the computer 600 and an external source. The image processing program set 634 is used for enabling the computer 600 to function as a data processing apparatus.

In response to an instruction to construct a data processor given from an application program (not shown) or a user by using the operation unit 618, the data processing apparatus implemented by the processing program set 634 constructs a data processor that performs data processing (in this case, arithmetic processing) instructed by the application program or the user. The data processing apparatus then executes data arithmetic processing by using the constructed data processor in response to an instruction from the application program or the user.

Details of the processing program set 634 will be discussed. As shown in FIG. 19, the processing program set 634 is broadly divided into a module library 636, programs of a processing construction unit 642, and a processing manager library 647. As in the above-described image processing apparatus, the data processing apparatus configured in accordance with this exemplary embodiment constructs a data processor by connecting plural arithmetic modules 638 and plural buffer modules 640 in the form of a pipeline or a DAG in response to an instruction from an application program, etc. The arithmetic modules 638 execute predetermine arithmetic processing. Each of the buffer modules 640 is disposed at least prior to or subsequent to the corresponding arithmetic module 638 and includes a buffer for storing data therein. In each of the arithmetic modules 638, the processing load and the unit-processing data amount (in this exemplary embodiment, the unit-processing data amount is represented by the number of data elements, and thus, hereinafter referred to as the "unit processing data number") are set. The data processor is constructed in a manner similar to the above-described image processor, and an explanation thereof is thus omitted. Each of the arithmetic modules 638 includes a controller and an arithmetic processing engine, as in the image processing module 38 shown in FIG. 4A, and is operated in a manner similar to the image processing module 38. Each of the buffer modules 640 includes a buffer controller and a buffer, as in the buffer module 40 shown in FIG. 4B, and is operated in a manner similar to the buffer module 40.

In this exemplary embodiment, as well as the above-described exemplary embodiment, two processing modes, i.e., a parallel processing mode and a serial processing mode, are employed. In the parallel processing mode, the arithmetic modules 638 of the data processor perform arithmetic processing in parallel. In the serial processing mode, only one arithmetic module 638 performs arithmetic processing at one time, and the arithmetic modules 638 are serially switched to perform arithmetic processing. In the data processing apparatus, as in the image processing apparatus, when arithmetic processing is performed in the parallel processing mode, a data processor for parallel processing (hereinafter referred to as the "parallel data processor") is constructed. When arithmetic processing is performed in the serial processing mode, a data processor for serial processing (hereinafter referred to as the "serial data processor") is constructed. With this arrangement, the arithmetic processing mode in the data processor is switched. As in the buffer modules 40 of the image processor 50, a buffer module 640 with an exclusive control function is provided for performing parallel processing, and a buffer module 640 without an exclusive control function is provided for performing serial processing. In the module library 636, a program of the buffer module 640 with an exclusive control function and a program of the buffer module 640 without an exclusive control function are registered.

The processing manager library 647 includes, as shown in FIG. 19, plural module generators 644 (only one is shown in FIG. 19). The plural module generators 644 are associated with different arithmetic processing operations, and the processing construction unit 642 starts each of the module generators 644 so that the module generator 644 generates a module set including the arithmetic modules 638 and the buffer modules 640 to implement corresponding arithmetic processing.

Processing managers 646 whose programs are registered in the processing manager library 647 are broadly divided into a parallel processing manager 646-1 and a serial processing manager 646-2. The parallel processing manager 646-1 constructs a parallel data processor having a buffer module 640 with an exclusive control function so as to control the constructed data processor to execute arithmetic processing in the parallel processing mode (hereinafter may be referred to as the "parallel arithmetic processing"). The serial processing manager 642-2 constructs a serial data processor having a buffer module 640 without an exclusive control function so as to control the constructed data processor to execute arithmetic processing in the serial processing mode (hereinafter may be referred to as the "serial arithmetic processing").

Each of the processing managers 646 includes a workflow manager, a resource manager, and an error handler. The workflow manager controls the execution of arithmetic processing in the data processor. The resource manager manages the resources of the computer 600, such as the memory 614 and various files, used by the modules of the data processor. The error handler handles errors occurring in the data processor. The operations of the components of the processing manager 646 are similar to those of the processing manager 46 of the above-described image processing apparatus, and an explanation thereof is thus omitted.

The processing construction unit 642, which constructs a data processor in response to an instruction from an application program (not shown), includes a processing content/order determination unit 650, a parallel-processing-performance determination unit 652, and a selection starter 645. The processing content/order determination unit 650 identifies the content of processing to be executed and determines the order of arithmetic processing operations forming the processing. The parallel-processing-performance determination unit 652 calculates the parallel-processing degree and the overhead value so as to determine the parallel processing performance on the basis of the parallel-processing degree and the overhead value. The selection starter 645 selects and starts the parallel processing manager 646-1 or the serial processing manager 646-2 on the basis of a determination result output from the parallel-processing-performance determination unit 652 and performs control so that the selected processing manager 646 performs parallel arithmetic processing or serial arithmetic processing. In FIG. 19, as well as in FIG. 1, a program of only one parallel processing manager 646-1 and a program of only one serial processing manager 646-2 are shown. However, programs of plural parallel processing managers and programs of plural serial processing managers may be registered in the processing manager library 647.

Figure 20:
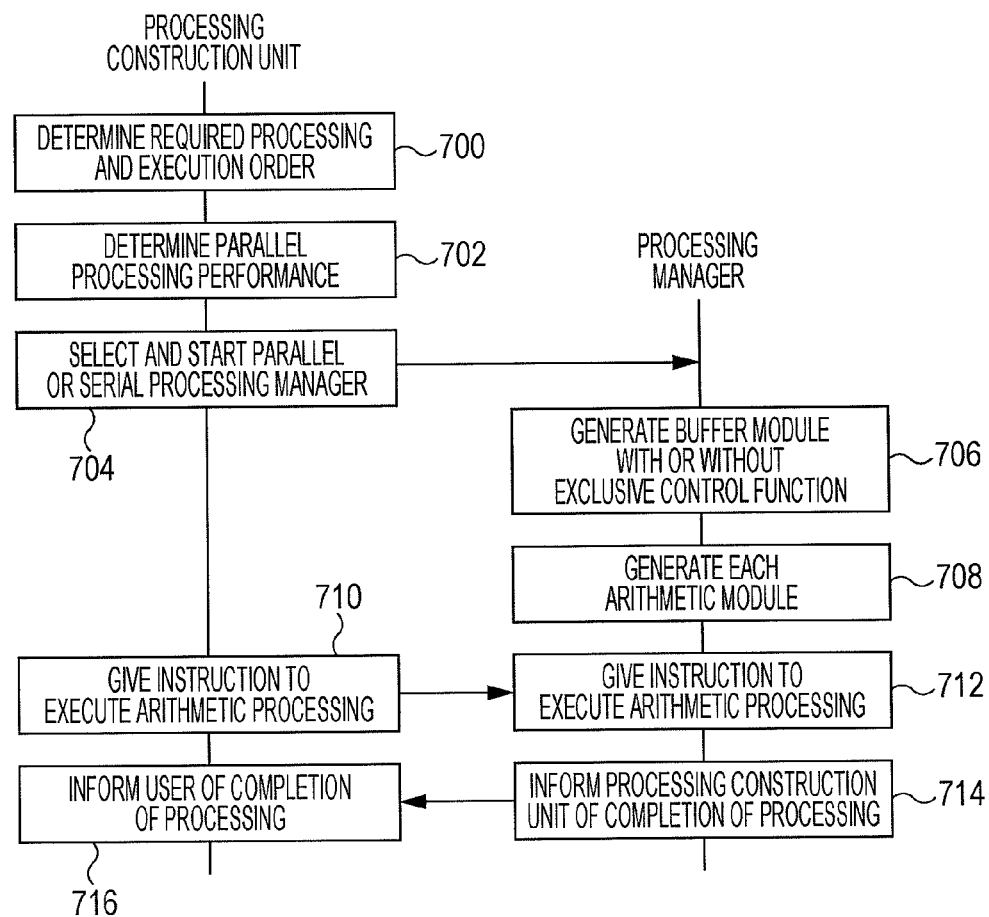
FIG. 20 is a sequence diagram illustrating an example of a series of processing operations from when a data processor is constructed until when arithmetic processing is executed.

The operation of the data processor apparatus formed by the computer 600 will now be described below with reference to FIGS. 20 through 22C. In this case, a data processor that executes arithmetic processing, such as multiplications and additions, on data representing the amount of money, and outputs an arithmetic result is constructed by way of example. FIG. 20 is a sequence diagram illustrating a series of processing operations from when a data processor is constructed until when arithmetic processing is executed. FIGS. 21A through 22C illustrate specific examples of parallel-processing-performance determination processing. In FIGS. 21A and 21B, "a", "b", "c", and "d" indicate the types of arithmetic modules 638, and in FIGS. 22A and 22B, "e", "f", "g", and "h" also indicate the types of arithmetic modules 638.

In the data processor shown in FIGS. 21A and 21B, the arithmetic module "a" calculates a value obtained by adding a consumption tax to the input amount of money, the arithmetic module "b" adds 1000 to the value calculated by the arithmetic module "a", the arithmetic module "c" multiplies the value calculated by the arithmetic module "b" by 1/10 to determine 10% of the resulting value, and the arithmetic module "d" subtracts 50 from the value calculated by the arithmetic module "c".

In the data processor shown in FIGS. 22A and 22B, the arithmetic module "e" adds the amounts of money of the ten data elements so as to calculate the total value, the arithmetic module "f" calculates the ratio of the value of each data element to the total value calculated by the arithmetic module "e", the arithmetic module "g" adds the values calculated by the arithmetic module "f" item by item, and the arithmetic module "h" calculates the ratio of each value calculated by the arithmetic module "f" to the total value calculated by the arithmetic module "g".

When it is necessary to perform certain arithmetic processing because, for example, a user gives an instruction to execute arithmetic processing, the processing content/order determination unit 650 of the processing construction unit 642 identifies the content of processing to be executed and decomposes the processing to be executed into a combination of arithmetic processing operations corresponding to the module generators 644. The processing content/order determination unit 650 then determines the types of arithmetic processing operations necessary for implementing the processing to be executed and also determines the execution order of the individual arithmetic processing operations (see also step 700 of FIG. 20).

The parallel-processing-performance determination unit 652 of the processing construction unit 642 calculates values for determining the parallel processing performance. In this case, the parallel-processing-performance determination unit 652 calculates the sum of processing loads of the arithmetic modules 640, the processing wait degrees of the arithmetic modules 640, and the number of arithmetic modules 640 forming the data processor.

As in the processing load used for calculating the parallel-processing degree of the above-described image processor 50, the "processing load" of each arithmetic module 638 is represented by a load (time necessary for performing the unit processing), which has been measured in advance for each arithmetic module 638, by five levels (level 1 to level 5). The processing load may be represented by a value corresponding to the number of additions and multiplications executed within the unit processing of each arithmetic module 638. The parallel-processing-performance determination unit 652 adds the processing loads of the arithmetic modules 638 so as to calculate the sum of the processing loads.

The "processing wait degree" is calculated on the basis of the unit processing data number (the number of data elements that have been processed in the previous module, i.e., the number of data elements necessary for performing unit processing) of each arithmetic module 638 according to the following equation.

Processing wait degree=the number of arithmetic modules/the unit processing data number of each arithmetic module Then, the parallel processing performance is determined by using the above-described values.

If the expression: the sum of processing loads of the arithmetic modules×processing wait degree>the number of arithmetic modules, is satisfied, it is determined that the time necessary to complete the parallel arithmetic processing would be shorter than the time necessary to complete the serial arithmetic processing.

If the expression: the sum of processing loads of the arithmetic modules×processing wait degree<the number of arithmetic modules, is satisfied, it is determined that the time necessary to complete the parallel arithmetic processing would be longer than the time necessary to complete the serial arithmetic processing.

If the expression: the sum of processing loads of the arithmetic modules×processing wait degree=the number of arithmetic modules, is satisfied, it is determined that the time necessary to complete the parallel arithmetic processing is the same as the time necessary to complete the serial arithmetic processing.

In the above-described three expressions, "the sum of processing loads of the arithmetic modules×processing wait degree" designated in the left side represents the parallel-processing degree, and the "number of arithmetic modules" designated in the right side represents the overhead value.

The parallel-processing-performance determination unit 652 outputs a determination result to the selection starter 645 (see also step 702 of FIG. 20).

In the example shown in FIGS. 21A through 21C, as shown in FIG. 21C, the sum of the processing loads of the arithmetic modules 638 is 8, the processing wait degree is 1, and the number of arithmetic modules 638 is 4, and thus, 8×1>4. It is thus determined that the time necessary to complete the parallel arithmetic processing would be shorter than the time necessary to complete the serial arithmetic processing (high performance can be expected by performing parallel processing). In contrast, in the example shown in FIGS. 22A through 22C, as shown in FIG. 22C, the sum of the processing loads of the arithmetic modules 638 is 8, the processing wait degree is 0.286, and the number of arithmetic modules 638 is 4, and thus, 8×0.286<4. It is thus determined that the time necessary to complete the parallel arithmetic processing would be longer than the time necessary to complete the serial arithmetic processing (high performance cannot be expected even by performing parallel processing).

The selection starter 645 selects a processing manager to be started in accordance with the determination result received from the parallel-processing-performance determination unit 652 (see also step 704 of FIG. 20). In this case, if it is determined that the time necessary to complete the parallel arithmetic processing would be shorter than the time necessary to complete the serial arithmetic processing, the selection starter 645 selects and starts the parallel processing manager 646-1 so that arithmetic processing is performed in the parallel processing mode. If it is determined that the time necessary to complete the parallel arithmetic processing would be longer than the time necessary to complete the serial arithmetic processing, the selection starter 645 selects and starts the serial processing manager 646-2 so that arithmetic processing is performed in the serial processing mode. If it is determined that the time necessary to complete the parallel arithmetic processing is the same as the time necessary to complete the serial arithmetic processing, either of the parallel processing manager 642-1 or the serial processing manager 642-2 may be selected and started. Accordingly, a determination regarding whether which processing manager is to be selected and started is set in advance, and the processing manager is selected and started in accordance with the setting.

If the started processing manager is the parallel processing manager 646-1, the buffer module 640 with an exclusive control function is generated. If the started processing manager is the serial processing manager 646-2, the buffer module 640 without an exclusive control function is generated (see also step 706 of FIG. 20). Further, the processing construction unit 642 starts the arithmetic module generator 644 corresponding to specific arithmetic processing on the basis of the type of arithmetic processing and the execution order of the arithmetic processing operations. The processing construction unit 642 then supplies information necessary for the arithmetic module 644 to generate a module set and instructs the arithmetic module 644 to generate an arithmetic module set (not shown in FIG. 20). If there are plural arithmetic processing types, the processing construction unit 642 generates other module generators 644 corresponding to the individual arithmetic processing types, and supplies information necessary for the module generators 644 to generate arithmetic modules. This is repeated in ascending order of execution. With this processing, the arithmetic module generators 644 of the processing manager library 647 generate the arithmetic modules 638 (see also step 708 of FIG. 20).

Upon completion of the construction of a data processor that performs required arithmetic processing as a result of sequentially generating the arithmetic modules 638 by use of the arithmetic module generators 644, the data construction unit 642 instructs the processing manager 646 in operation to execute arithmetic processing by using the data processor (see also step 710 of FIG. 20). In response to an instruction to execute arithmetic processing, the processing manager 646 causes the CPU 612 via the OS to execute, as threads, the programs of the modules of the data processor loaded into the memory 614 (see also step 712 of FIG. 20). If the processing manager 646 in operation is the parallel processing manager 646-1, the parallel processing manager 646-1 causes the CPU 612 to execute, as independent threads, the programs of the individual modules forming the data processor so that the individual arithmetic modules 638 perform arithmetic processing in parallel. If the processing manager 646 in operation is the serial processing manager 646-2, the serial processing manager 646-2 causes the CPU 612 to execute, as a single thread, the programs of the individual modules forming the data processor. Instead of threads, the processing manager 646 may cause the CPU 612 to execute the programs of the individual modules as processes or objects.

Upon completion of a series of arithmetic processing operations executed by the data processor, the processing manager 646 informs the processing construction unit 642 of the completion of arithmetic processing (see also step 714 of FIG. 20). Upon receiving the processing completion notification, the processing construction unit 642 informs the user of the completion of arithmetic processing (see also step 716 of FIG. 20).

The configuration of the above-described data processing apparatus is an example only, and is not restricted to the above-described example. For example, in the above-described data processing apparatus, the parallel processing manager 642-1 or the serial processing manager 642-2 is selected and started in accordance with a result of determining the parallel processing performance. Alternatively, instead of selecting and starting the processing manager, only a determination result may be output. The parallel processing performance may be determined in another manner. For example, various parameters may be used to calculate the parallel-processing degree and the overhead value.

In the above-described data processing apparatus, a data processor is constructed by connecting the buffer modules 640 to the arithmetic modules 638. However, if the amount of data which is delivered from a previous module to a subsequent module is small, the provision of the buffer modules 40 may be omitted.

The processing mode may be selected by considering the operating environments of the image processor 50 (or data processor). For example, the number of program execution resources (e.g., a CPU) provided in the computer 10 may be used. For example, the following conditions may be set: "if the number of program execution resources is equal to N or greater, and if the result of determining the parallel processing performance shows that the time necessary to complete the parallel processing would be shorter than the time necessary to complete the serial processing, the parallel processing manager 46-1 (646-1) may be started, and if the result is other than the above-described result, the serial processing manager 46-2 (646-2) may be started".

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus including a data processor comprising a plurality of processing modules, configured to be connected to each other serially or in parallel and executed on a processor, that perform data processing including different data processing operations or that perform a data processing operation with different contents, each of the plurality of processing modules having a function of obtaining data from a processing module positioned prior to itself, performing a processing operation on the obtained data, and outputting data as a result of performing the processing operation on the obtained data or outputting a result of processing the obtained data to a processing module positioned subsequent to itself, the data processing apparatus comprising:

an output unit that determines, in response to performance of parallel control in the data processor so that the plurality of processing modules perform data processing in parallel, on the basis of a value representing a parallel-processing time for which at least two of the processing modules are operated in parallel and a value representing a control time, which is not required when serial control is performed so that the processing modules serially perform data processing but which is required when the parallel control is performed so that the processing modules perform data processing in parallel, whether a time required to complete data processing performed by the data processor under the parallel control would be shorter than a time required to complete data processing performed by the data processor under the serial control, and that outputs a determination result.

2. The data processing apparatus according to claim 1, further comprising:

a controller that performs control so that the parallel control is performed if the determination result which is output from the output unit indicates that the time required to complete data processing performed by the data processor under the parallel control would be shorter than the time required to complete data processing performed by the data processor under the serial control, and that performs control so that the serial control is performed if the determination result which is output from the output unit indicates that the time required to complete data processing performed by the data processor under the parallel control would be longer than the time required to complete data processing performed by the data processor under the serial control.

3. The data processing apparatus according to claim 1, wherein the value representing the parallel-processing time is calculated by using at least one of a value representing a time required for each of the plurality of processing modules to perform unit processing, and a value obtained by multiplying values, each of which represents an amount of data which is to be processed by a processing module positioned prior to a certain processing module and which is required by the certain processing module.

4. The data processing apparatus according to claim 3, wherein a value "a" is used as the value representing the parallel-processing time, the value "a" being expressed by an equation:

"a"=a sum of values, each of which represents a time required for each of the plurality of processing modules to perform the unit processing×a value obtained by multiplying values, each of which represents an amount of data which is to be processed by a processing module positioned prior to a certain processing module and which is required by the certain processing module.

5. The data processing apparatus according to claim 4, wherein the data processing performed by each of the plurality of processing modules of the data processor is image processing of image data, and a value "b" is used as the value representing an amount of data which is to be processed by a processing module positioned prior to a certain processing module and which is required by the certain processing module, the value "b" being expressed by an equation:

"b"=1−{an amount of data to be processed during the unit processing by each of the plurality of processing modules/(an amount of image data representing the entirety of an image to be processed by the data processor×an adjustment value)}.

6. The data processing apparatus according to claim 5, wherein the value representing the amount of data which is to be processed by a processing module positioned prior to a certain processing module and which is required by the certain processing module is set to be a value which is determined in advance in accordance with whether image processing to be performed in each of the plurality of processing modules is page processing, which is used for processing data representing one frame of an image, or line processing, which is used for processing data representing one line of an image, which is smaller than one frame of the image.

7. The data processing apparatus according to claim 3, wherein the value representing the time required for each of the plurality of processing modules to perform the unit processing is set to increase as the number of specific arithmetic operations to be executed in each of the plurality of processing modules increases.

8. The data processing apparatus according to claim 3, wherein the value representing the time required for each of the plurality of processing modules to perform the unit processing is set to increase as the number of lines of a program code for each of the plurality of the processing modules increases.

9. The data processing apparatus according to claim 1, wherein the value representing the parallel-processing time is set to decrease as a variation in values, each of which represents a time required for each of the plurality of processing modules to perform unit processing, increases.

10. The data processing apparatus according to claim 1, wherein a coefficient corresponding to a connection mode of two consecutive processing modules positioned in the data processor is assigned to each of the plurality of processing modules, and the value representing the control time is set to be a total value of the coefficients assigned to the plurality of processing modules.

11. The data processing apparatus according to claim 10, wherein the coefficient is varied in accordance with whether the connection mode of the two consecutive processing modules is a serial connection or a parallel connection.

12. The data processing apparatus according to claim 11, wherein, if the connection mode of the two consecutive processing modules is parallel connection, the coefficient is varied in accordance with the number of processing modules connected in parallel.

13. The data processing apparatus according to claim 1, wherein the value representing the control time is set to increase as the number of processing modules of the data processor increases.

14. The data processing apparatus according to claim 1, wherein, if each of the plurality of processing modules of the data processor is started as a thread, the value representing the control time is set to increase as the ratio of an occurrence of a lock in the thread increases.

15. The data processing apparatus according to claim 1, wherein, if the value representing the parallel-processing time is greater than the value representing the control time, the output unit determines that the time required to complete data processing performed by the data processor under the parallel control would be shorter than the time required to complete data processing performed by the data processor under the serial control, and if the value representing the parallel-processing time is smaller than the value representing the control time, the output unit determines that the time required to complete data processing performed by the data processor under the parallel control would be longer than the time required to complete data processing performed by the data processor under the serial control.

16. The data processing apparatus according to claim 1, wherein, if a value obtained by subtracting the value representing the control time from the value representing the parallel-processing time is greater than a threshold, the output unit determines that the time required to complete data processing performed by the data processor under the parallel control would be shorter than the time required to complete data processing performed by the data processor under the serial control, and if the value obtained by subtracting the value representing the control time from the value representing the parallel-processing time is equal to or smaller than the threshold, the output unit determines that the time required to complete data processing performed by the data processor under the parallel control would be longer than the time required to complete data processing performed by the data processor under the serial control.

17. The data processing apparatus according to claim 1, wherein the output unit determines, on the basis of a result of comparing the value representing the parallel-processing time with a first threshold and a result of comparing the value representing the control time with a second threshold, whether the time required to complete data processing performed by the data processor under the parallel control would be shorter than the time required to complete data processing performed by the data processor under the serial control.

18. The data processing apparatus according to claim 1, wherein a parameter used for determining the value representing the parallel-processing time would be substantially the same as a parameter used for determining the value representing the control time.

19. The data processing apparatus according to claim 1, wherein the output unit determines, by comparing a value representing both the parallel-processing time and the control time with a first value, whether the time required to complete data processing performed by the data processor under the parallel control would be shorter than the time required to complete data processing performed by the data processor under the serial control.

20. A data processing method for use in a data processing apparatus including a data processor comprising a plurality of processing modules, configured to be connected to each other serially or in parallel and executed on a processor, that perform data processing including different data processing operations or that perform a data processing operation with different contents, each of the plurality of processing modules having a function of obtaining data from a processing module positioned prior to itself, performing a processing operation on the obtained data, and outputting data as a result of performing the processing operation on the obtained data or outputting a result of processing the obtained data to a processing module positioned subsequent to itself, the data processing method comprising:
  determining, in response to performance of parallel control in the data processor so that the plurality of processing modules perform data processing in parallel, on the basis of a value representing a parallel-processing time for which at least two of the processing modules are operated in parallel and a value representing a control time, which is not required when serial control is performed so that the processing modules serially perform data processing but which is required when the parallel control is performed so that the processing modules perform data processing in parallel, whether a time required to complete data processing performed by the data processor under the parallel control would be shorter than a time required to complete data processing performed by the data processor under the serial control, and outputting a determination result.

21. A non-transitory computer-readable storage medium storing a program causing a computer to execute a process, the computer being configured to function as a data processing apparatus including a data processor comprising a plurality of processing modules, configured to be connected to each other serially or in parallel and executed on the computer, that perform data processing including different data processing operations or that perform a data processing operation with different contents, each of the plurality of processing modules having a function of obtaining data from a processing module positioned prior to itself, performing a processing operation on the obtained data, and outputting data as a result of performing the processing operation on the obtained data or outputting a result of processing the obtained data to a processing module positioned subsequent to itself, the process comprising:
  determining, in response to performance of parallel control in the data processor so that the plurality of processing modules perform data processing in parallel, on the basis of a value representing a parallel-processing time for which at least two of the processing modules are operated in parallel and a value representing a control time, which is not required when serial control is performed so that the processing modules serially perform data processing but which is required when the parallel control is performed so that the processing modules perform data processing in parallel, whether a time required to complete data processing performed by the data processor under the parallel control would be shorter than a time required to complete data processing performed by the data processor under the serial control, and outputting a determination result.

* * * * *